United States Patent
Lange et al.

(10) Patent No.: US 6,787,080 B1
(45) Date of Patent: Sep. 7, 2004

(54) COLLOIDAL ISOPRESSING

(76) Inventors: Frederick F. Lange, 1175 Orchard Dr., Santa Barbara, CA (US) 93111; Benjamin C. Yu, 113 Exeter Ct., Sunnyvale, CA (US) 94087

( * ) Notice: Subject to any disclaimer, the term of this patent is extended or adjusted under 35 U.S.C. 154(b) by 5 days.

(21) Appl. No.: 10/111,953
(22) PCT Filed: Oct. 25, 2000
(86) PCT No.: PCT/US00/29407
§ 371 (c)(1), (2), (4) Date: Jul. 19, 2002
(87) PCT Pub. No.: WO01/32377
PCT Pub. Date: May 10, 2001

Related U.S. Application Data
(60) Provisional application No. 60/162,097, filed on Oct. 29, 1999.

(51) Int. Cl.[7] .................................................. B28B 1/26
(52) U.S. Cl. ......................... 264/86; 264/621; 264/651; 264/667
(58) Field of Search ...................... 264/86, 621, 651, 264/667

(56) References Cited

U.S. PATENT DOCUMENTS 5,167,887 A * 12/1992 Su .............................. 264/626
5,219,805 A *  6/1993 Yoshida et al. ............. 501/103
5,672,363 A *  9/1997 Sagawa et al. ................ 425/3

* cited by examiner

Primary Examiner—Christopher A. Fiorilla
(74) Attorney, Agent, or Firm—Fulbright & Jaworski

(57) ABSTRACT

Colloidal isopressing provides a rapid method to form an engineering shape from a powder slurry, previously filtered to remove strength degrading inclusions. A slurry composed of a weakly attractive particle network, produced with a short-range, repulsive interparticle par potential, is consolidated to make a body with a high particle density that is easily fluidized by vibration. The fluid-like body is injected into a flexible mold and subjected to a larger isostatic pressure to force particles into contact. This creates a strong, elastic body with the shape of the mold. Because the particles are forced into contact at a high pressure, the liquid remaining within the component can be removed by evaporation without shrinkage, avoiding fracture during rapid drying.

28 Claims, 9 Drawing Sheets

10 mm

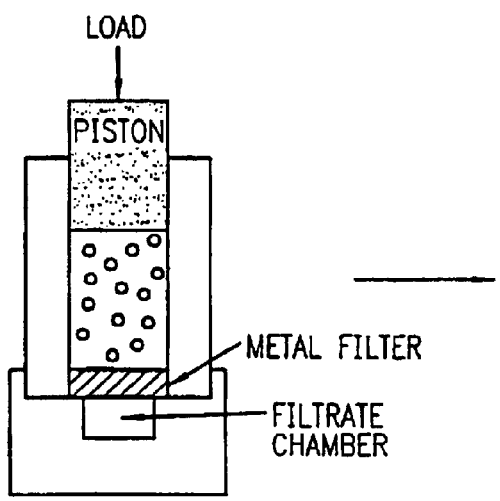
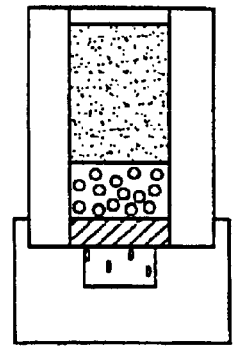
FIG. 7a    FIG. 7b
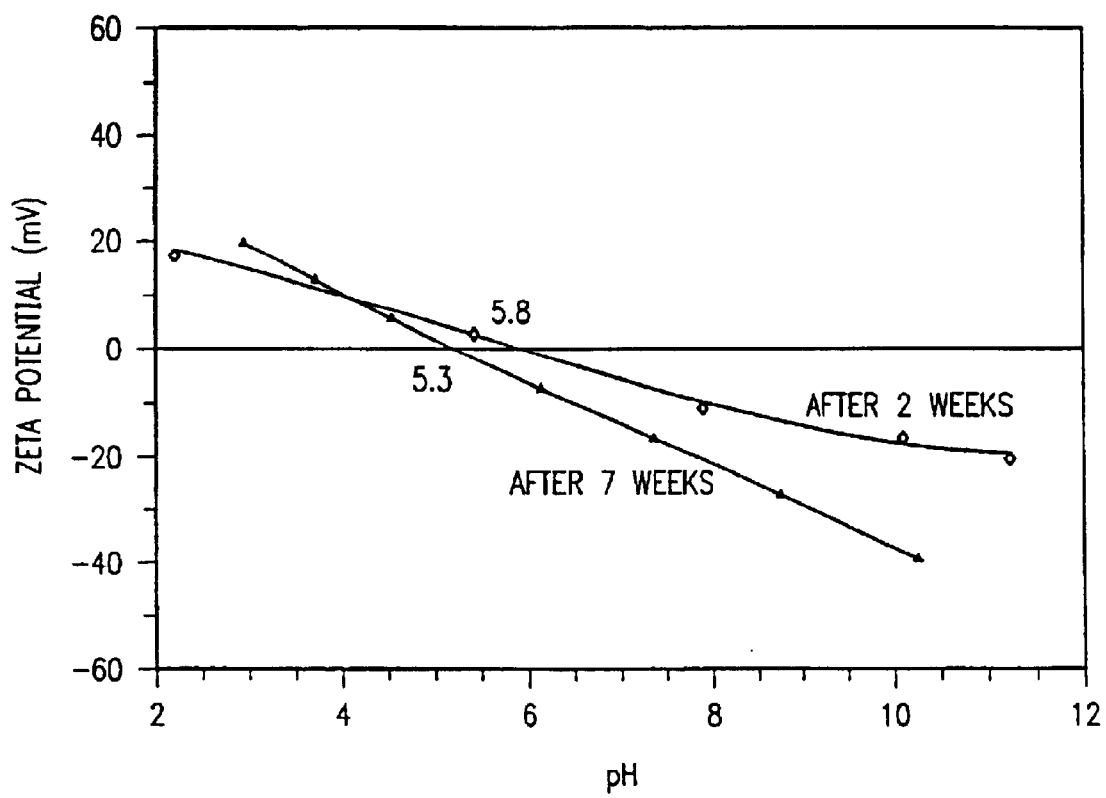
FIG. 8a

| BATCH | A | A | A | B |
|---|---|---|---|---|
| PEG-SILANE (wt%) | 2 | 2 | 1 | 2 |
| SALT | TMACl | TMANO$_3$ | TMANO$_3$ | TMANO$_3$ |
| SALT CONCENTRATION (M) | 0.5 | 0.5 | 0.5 | 0.5 |
| pH | 10.1 | 10.1 | 10.1 | 8.7 |
| CONSOLIDATION PRESSURE (MPa) | 2 | 2 | 2 | 2 |
| INITIAL SHEAR MODULUS (MPa) | 1.3 | 0.9 | 13 | 4.5 |
| AVERAGE YIELD STRESS (Pa) | 294 | 406 | 213 | 684 |

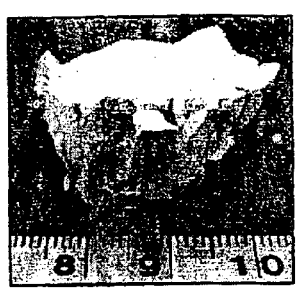  
FIG. 13a          FIG. 13b          FIG. 13c
| BATCH | PEG-SILANE (wt%) | SALT | SALT CONC. (M) | pH | REL. DENSITY FILTER-PRESSED (%) | EXTRUDABLE? | REL. DENSITY ISOPRESSED (%) |
|---|---|---|---|---|---|---|---|
| A | 2 | — | — | 10.1 | 57.9 | NO | |
| A | — | TMACl | 0.75 | 10.1 | 47.8 | NO | |
| A | 1 | TMACO$_3$ | 0.5 | 10.1 | 48.4 | NO | |
| A | 2 | TMACl | 0.5 | 10.1 | 50.6 | YES | 57.8 |
| A | 2 | TMANO$_3$ | 0.5 | 10.1 | 51.8 | YES | 60.1 |
| B | 2 | TMANO$_3$ | 0.5 | 8.7 | 51.3 | YES | 61.7 |
FIG. 14
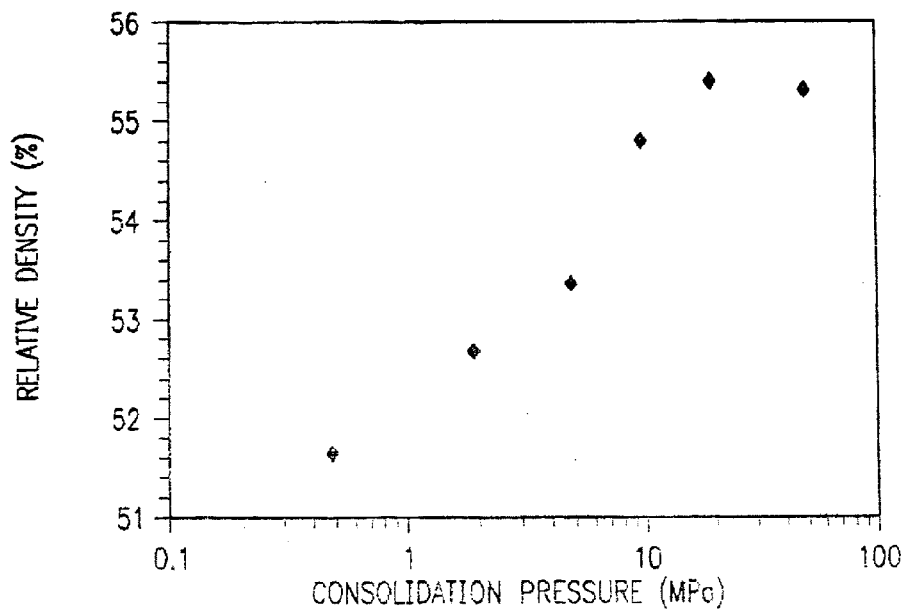
FIG. 15

COLLOIDAL ISOPRESSING

CROSS REFERENCE TO RELATED APPLICATIONS

This application is a 371 of PCT/US00/29407 filed Oct. 25, 2000.

This application claims the benefit of Provisional Patent Application No. 60/162,097 filed Oct. 29, 1999, which is hereby incorporated by reference for all purposes.

STATEMENT REGARDING FEDERALLY SPONSORED RESEARCH OR DEVELOPMENT

This invention was made with Government support under Grant No. F49620-96-1-0003, awarded by the Air Force Office of Scientific Research. The Government has certain rights in this invention.

BACKGROUND OF THE INVENTION

1. Field of the Invention

The invention relates to the formation of products from powder slurries.

2. Description of Related Art

Ceramic components, ranging from silicon nitride turbocharger rotors, used in high-performance automobiles, to translucent aluminum oxide tubes, used in high efficiency yellow sodium lamps, are formed by molding a powder into the desired engineering shape. The powder compact is then densified to its final form by a high temperature heat treatment. Because advanced ceramic powders such as silicon nitride and alumina lack the plastic properties of traditional clay-based ceramics, conventional shape forming is carried out by either the pressure consolidation of a dry powder or by the pressure forming of a powder containing a large fraction of a polymer that imparts plasticity. As received, ceramic powders contain agglomerates, inorganic and organic inclusions, and other inhomogeneities that degrade both the electrical and mechanical properties of sintered, dense bodies. As a result, both of these commercial shaping methods suffer from inclusions, present in the powder and retained during shape forming and densification. These inclusions concentrate any applied stress to severely degrade the component's strength. Agglomeration via spray drying prior to dry pressing incorporates more contaminants from the drying air, and crack-like void spaces are generated when the spray-dried agglomerates do not fully deform. In addition, the large quantity of polymer required for plastic forming (on the order of 40% by volume) must be removed very slowly to avoid defect formation.

It is known that the reliability of ceramic components can be improved by processing the powder as a colloidal suspension [F. F. Lange, "Powder processing science and technology for increased reliability," J. Am. Ceram. Soc. 72, 3 (1989)]. When the ceramic particles are dispersed in a liquid, the slurry can be passed through a filter to remove all inclusions greater than the size defined by the filter. Reducing the inclusion size will increase the average strength and component reliability. Techniques currently employed to form engineering shapes from a slurry can be categorized as either consolidation or direct shaping methods.

Consolidation methods start with a slurry containing a low volume fraction of powder that is concentrated by either evaporation or pressure filtration. Examples include tape casting (evaporation) [R. E. Mistler, D. J. Shanefield, R. B. Runk, "Tape casting of ceramics," in Ceramic Processing Before Firing, G. Y Onoda, L L Hench Eds., (Wiley-Interscience, New York, 1978) pp. 411–448], slip casting (for the production of ceramic green parts, in which hardening is achieved, as is well known, by water removal with capillary pressure via a porous mold) [J. S. Reed, in Principles of Ceramic Processing (Wiley-Interscience, New York, ed. 2, 1995) pp. 493–503], and pressure filtration (external overpressure) [F. F. Lange, K. T. Miller, "Pressure filtration: Consolidation kinetics and mechanics," Am. Ceram. Soc. Bull. 66, 1498 (1987)]. Because the initial volume fraction of powder is <0.40, these dispersed slurries can first be passed through a filter to remove strength degrading inclusions. Consolidation methods also have the capability to produce bodies with the highest relative density. However, because the liquid removed during consolidation must flow through the body as it consolidates, these methods generally require long periods within the mold. Additionally, tape casting and slip casting, are typically limited to thin (or thin walled) bodies.

Direct shaping methods start with a slurry containing a high volume fraction of powder (>0.50) that can still be either poured or injected into a mold. Unlike the consolidation methods, the volume fraction of powder does not change during molding. Highly repulsive interparticle potentials are needed to formulate flowable slurries containing a high volume fraction of powder. Within the mold, the slurry must be converted to an elastic body so the component can retain its shape upon removal from the mold. Direct shaping methods include injection molding, gel casting, direct coagulation casting and vibra-forming [J. A. Mangels, "Injection molding ceramics," Ceram. Eng. Sci. 3, 529 (1982); A. C. Young, O. O. Omatete, M. A. Janney, P. A. Menchhofer, "Gelcasting of alumina," J. Am. Ceram. Soc. 74, 612 (1991); T. J. Graule, F. H. Baader, L. J. Gauckler, "Shaping of ceramic green compacts direct from suspensions by enzyme catalyzed reactions," cfi/Ber. DKG 71, 317 (1994); and G. V. Franks, B. V. Velamakanni, F. F. Lange, "VibraForming and in-situ flocculation of consolidated, coagulated alumina slurries," J. Am. Ceram. Soc. 78, 1324 (1995)]. In the case of injection molding and gel casting, the slurry's liquid phase solidifies, respectively, by freezing or polymerization. For direct coagulation casting and vibra-forming, the particle network within the slurry is solidified by changing the pH of the slurry to the isoelectric point (the pH where the net surface charge on the particle is zero) via a temperature induced chemical reaction. Because slurries used for all direct shaping methods must contain the highest volume fraction of powder possible, they are too viscous to remove strength degrading inclusions by filtration. Although injection molding only requires very short periods within the mold, very long periods are needed to remove the polymer without causing cracking, blistering, etc. The periods required to convert the molded slurry into an elastic body is too long (10 minutes to several hours) to utilize either gel casting, direct coagulation casting or vibra-forming as rapid forming methods.

After a component is shaped by any one of these methods, the liquid within the powder compact must be removed before densification at high temperature. Shrinkage typically occurs during evaporative drying because the powder can further consolidate, driven by capillary (Laplace) pressure. Surface tensile stresses associated with shrinkage may arise if the exterior portion of the body, where evaporation initiates, is constrained by the interior. The magnitude of the tensile stress, which can induce cracking, depends on a number of factors including the initial relative density achieved during shape forming and the rate of drying [G. W. Scherer, "Theory of drying," J. Am. Ceram. Soc. 73, 3

(1990)]. Bodies produced by direct shaping methods are more prone to cracking because they exhibit greater shrinkage relative to the higher density, consolidated bodies.

Pujari et al., have shown that the average strength and reliability of tensile specimens can be greatly improved by filtering inclusions from slurries prior to compact formation by pressure filtration [V. K. Pujari et al., "Reliable ceramics for advanced heat engines," *Am. Ceram. Soc. Bull.* 74, 86 (April 1995)]. Unfortunately, most of the colloidal forming methods described above have only found niche industrial applications. For example, tape casting is one viable technique for fabrication of multilayer electronic packages. In general, the long forming periods, large fractions of polymer that must be removed prior to densification, and/or the inability to remove inclusions prior to shaping are the limiting factors for economical, industrial practice.

SUMMARY OF THE INVENTION

The present invention provides a new method to form ceramic components from colloidal suspensions of ceramic powders, in which isostatic, pressure is applied to a colloidal suspension, and which we call colloidal isopressing. The method starts with a slurry that can be filtered to remove strength degrading inclusions. After an initial, low pressure consolidation, which can use pressure filtration to create a fluid-like consolidated body, the shape forming method requires only a short isopressure period within a flexible mold. Following shaping, the saturated body can be rapidly dried without shrinkage, or in accordance with an embodiment of the invention, heated directly to the densification temperature. Post-processing machining is minimized or eliminated because the shape and contours imparted by the mold are retained during drying and densification. The invention is exemplified with water as the fluid, preferred for environmental and health reasons, but the process can be conducted with other solvents and liquids. The invention is not limited to a specific fluid; in some cases, e.g., where the powder reacts or dissolves in water, organic fluids can be used.

Two phenomena, discovered in previous studies, enable this new forming technology. The first is a method to produce a repulsive interparticle pair potential that persists after pressure consolidation. The second is the discovery that a critical consolidation pressure exists that separates plastic and brittle behavior. The present invention applies a new forming method using these phenomena, illustrated with alumina powder, silicon nitride powder, zirconia powder, and silicon nitride aqueous slurries. Alternative ceramic powders can be used, including silicon carbide, aluminum nitride, titania, barium titanate, zinc oxide, and lead-zirconate-titanate. Powder or particles other than ceramics can be used, for example , and organic polymers, such as poly(ether ether ketone) and Teflon, where the short-range repulsive potential is developed by steric methods. In accordance with this invention, the particles are attracted to one another in a slurry formulation by the pervasive van der Waals potential, but they are prevented from touching with a short range repulsive potential. The van der Waals potential always causes particles of the same material to be attractive when the surrounding fluid has a different dielectric constant. By itself, the van der Waals potential produces a network of particles in elastic contact. Due to friction, touching particles are difficult to rearrange during consolidation and therefore do not produce the highest relative density [J. C. Chang, F. F. Lange, D. S. Pearson, J. P. Pollinger, "Pressure sensitivity for particle packing of aqueous $Al_2O_3$ slurries vs. interparticle potential," *J. Am. Ceram. Soc.* 77, 1357 (1994)]. To keep the particles apart, low density matter that does not significantly contribute to the van der Waals potential shrouds the particles and causes an increase in the free energy when the shrouds of approaching particles interact. The interpenetrating shrouds keep the particles apart and, in effect, shield either a portion or all of the attractive van der Waals potential. When the electrostatic double layer method (approximated by the DLVO theory) is used to produce a repulsive potential, counterions comprise the shroud [R. G. Hom, "Surface forces and their action in ceramic materials," *J. Am. Ceram. Soc.* 73, 1117 (1990)]. When the steric approach is used, the shroud is composed of molecules, e.g. linear molecules bonded to the surface and extending into the surrounding fluid.

Colloidal isopressing has attributes of both the consolidation and direct shaping methods. It is known that particles held apart by a short-range repulsive potential can be pushed into contact during consolidation when the applied pressure is greater than a critical value [G. V. Franks, F. F. Lange, "Plastic-to-brittle transition of saturated, alumina powder compacts," *J. Am. Ceram. Soc.* 79, 3161 (1996)]. The critical transition pressure between plastic and brittle behavior was determined by filter pressing dilute slurries at varying pressures and mechanically testing the formed compacts in uniaxial compression. Bodies were either plastic, i.e., would flow at a yield stress, or crack. The consolidation pressure that separates the plastic behavior from the cracking (brittle) behavior is the critical transition pressure. When the slurry is consolidated below the critical pressure, the consolidated body can be made to flow at a stress that is governed by the interparticle pair potential formulated in the slurry state. At pressures above this critical value, the consolidated body exhibits elastic behavior. We use this plastic-to-elastic transition by first consolidating a body below the critical pressure, injecting the fluid-like body into a flexible mold, e.g. of rubber, then isopressing the filled mold above the critical pressure. The high isostatic pressure acts to convert the fluid-like material to an elastic body that can be removed from the rubber mold without shape distortion. Above the critical consolidation pressure, the particles are forced into contact and pack to their highest relative density. Therefore, the liquid that remains can be rapidly removed by evaporation without either shrinkage or cracking.

Implementing colloidal isopressing does not require the development of new capital equipment: filter (de-watering) presses are used in the clay industry to consolidate clay slurries, and isostatic presses are used to produce millions of spark plug insulators daily.

These and other features, aspects, and advantages of the present invention will become better understood with regard to the following detailed description, appended claims, and accompanying drawings.

BRIEF DESCRIPTION OF THE DRAWINGS

FIGS. 7a–b are schematics of the pressure filtration mechanism, where a load is applied to a piston (FIG. 7a) and after consolidation is complete (FIG. 7b);

FIGS. 8a–b are graphs illustrating the variation of the zeta potential of AS800 containing 2 wt % PEG-silane over time for one batch, batch A (FIG. 8a) and between two batches, A and B aged less than two weeks (FIG. 8b);

FIGS. 13a–c show consolidated AS800 bodies after uniaxial compression with a loading rate of 1 mm/min, batch B, 2 wt % PEG-silane, 0.5M TMANO$_3$, with a consolidation pressure of: 0.5 MPa (FIG. 13a), 2 MPa (FIG. 13b) and 50 MPa (FIG. 13c);

FIG. 14 is a table listing the relative densities after pressure filtration at 2 MPa and isopressing at 200 MPa for one minute;

FIG. 15 is a graph illustrating the relative density versus the consolidation pressure (AS800, batch B, 2 wt % PEG-silane, 0.5M TMANO$_3$;

DETAILED DESCRIPTION

In the present invention, two slurry methods, pressure consolidation and direct forming, were combined to produce a new forming method, which we call, colloidal isopressing, a two step process that utilizes existing equipment (dewatering presses and isostatic presses) to quickly form complex shaped components. In the first step, filtered slurries are formulated and consolidated, e.g., by pressure filtration, to produce a body with a high solid fraction. In the second step, the consolidated body is fluidized, injected into a rubber mold, and rapidly transformed into an elastic body with the application of isostatic pressure.

Figure 1:
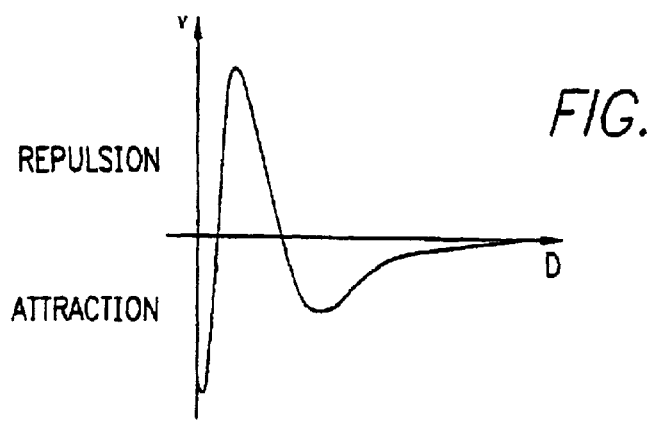
FIG. 1 is a schematic of weakly attractive interparticle potential showing the interaction comes from a combination of the van der Waals attraction and a short range repulsion, forming a secondary minimum at finite separation.

The interparticle pair potential determines the rheological properties of slurries and the mechanical behavior of saturated, consolidated powder compacts. J. A. Yanez, T. Shikata, F. F. Lange, and D. S. Pearson, "Shear Modulus and Yield Stress Measurements of Attractive Alumina Particle Networks in Aqueous Slurries," *J. Amer. Ceram. Soc.,* 79 [11] 2917–24 (1996); G. V. Franks and F. F. Lange, "Plastic-to-Brittle Transition of Saturated, Alumina Powder Compacts," *J. Amer. Ceram. Soc.,* 79 [12] 3161–68 (1996). Three general interparticle pair potentials exist. The pervasive, attractive van derWaals forms a strong, shear-rate thinning, high viscosity, touching particle network. When the interparticle potential is strongly repulsive, the slurry can exhibit Newtonian behavior (viscosity independent of shear rate), and a low viscosity. When the particles are first attracted to one another by the van der Waals potential, and then repelled by a short range repulsive potential, the particles form an attractive, but non-touching network. This is shown schematically in FIG. 1, where D is distance and V is the interparticle potential. This coagulated system exhibits shear-rate thinning behavior, but with a lower viscosity than the touching network formed by only the van der Waals potential.

Two general methods are used to produce repulsive potentials. One method is to adsorb molecules on the surface of the particles, e.g., as extended hydrocarbon chains that form "brush" configurations. When the "brushes" on one particle interact with the "brushes" on another particle, the configurational entropy of the molecules is decreased, and the free energy is increased. As the particle are pushed further together, strain energy arises within the molecular brushes, also increasing the system's free energy. Both effects that increase the free energy produce a repulsive interparticle potential. When the molecules are long, the van der Waals attractive potential is essentially shielded, and the particles exhibit a long range repulsive potential. When the molecules are very short, the van der Waals potential first causes the particles to be attractive until the short molecules produce repulsion.

The second method, one that is used in the present invention is known as the electrostatic double layer method. In aqueous slurries, particles develop a surface charge that is neutralized by a cloud of ions, called counterions, that surround the particles. The surface charge develops when neutral —M—OH surface sites react with either hydronium or hydroxyl ions to generate a surface charge via two competing reactions:

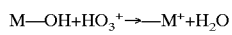

and

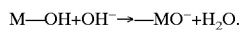

The first reaction dominates at low pH and the second, at high pH. At a specific pH know as the isoelectric point (iep), both reactions have an equal intensity, creating a net neutral surface. This pH depends on the material and the surface chemistry. For aluminum oxide, the iep is generally between pH 8 and 9 [R. A. Srinivasa, "Electrophoretic Mobility of Alumina, Titania and Their Mixtures in Aqueous Dispersions," *Ceram. Int.,* 14 [2] 71–6 (1988)].

Oppositely charged ions (not shown in the reactions), called counterions, form a cloud that shrouds the particles. The Debye length characterizes the effective, interaction distance of the cloud. As particles approach, the counterion clouds will begin to overlap well before the particles come into physical contact. This causes a local increase in the counterion concentration between the particles which increases the free energy and produces a repulsion.

The Debye length can be altered by adjusting the concentration of counterions in solution. The addition of a non-potential determining salt will add counterions without changing the surface charge. Increased counterion concentration will decrease the Debye length, and thus, decrease the interaction distance. Above a critical, concentration of counterions, known as the critical coagulation concentration, the Debye length is sufficiently compressed such that the particle are first attracted by the van der Waals potential, then repelled by the compressed counterion cloud. In this condition, the particles will reside at an equilibrium separation distance determined by a secondary potential minimum. This weakly attractive, but non-touching particle network is desired for developing a plastic, consolidated body.

A phenomenon known as the plastic-to-brittle transition has been observed for consolidated bodies with a weakly attractive network. [G. V. Franks and F. F. Lange, "Plastic-to-Brittle Transition of Saturated, Alumina Powder Compacts," supra]. Franks and Lange first characterized this behavior in saturated alumina compacts formed by pressure filtration. [G. V. Franks and F. F. Lange, "Plastic-to-Brittle Transition of Saturated, Alumina Powder Compacts," supra]. The consolidated powder bodies were tested in uniaxial compression and their deformation behavior was characterized by both the stress-strain relationship and their physical appearance. Bodies consolidated at low pressures exhibited plastic flow and a smooth transition between the peak stress and a smaller flow stress. Plastic flow could be extensive, i.e., strains >0.5, without cracking, were common. Slurries consolidated above a critical pressure exhibited brittle behavior evidenced by a sharp transition in the stress-strain curve when vertical cracks popped into the compacts.

The change in deformation mode (plastic to brittle) during unconstrained, uniaxial compression was attributed to the fact that the short range repulsive potential barrier could be overcome when the particles are pushed together during consolidation. Whether or not a majority of the particles are pushed into contact during pressure filtration depended on both the consolidation pressure and the interparticle pair potential in the slurry state. Under low consolidation pressures, a great majority of the particles in a coagulated system will remain separated from their neighbors due to the electrostatic double layer repulsion. That is, at low applied pressure, the compressive forces between particles is not great enough to force the particles over the potential barrier into touching contact. Because most of the particles retain their repulsive interparticle pair potential after consolidation, the compact can flow after a yield stress is exceeded.

Consolidation by pressure filtration prior to filling the rubber mold and isopressing is critical. First, it consolidates the powder to a very high volume fraction, much higher than one can achieve by mixing powder with a liquid to form a slurry. Because of the very high volume fraction of powder, the time in the second step, i.e., isopressing within the rubber mold is very short. This is because during isopressing, some liquid must be removed so that the isopressure can be applied to the particle network. The time required to remove the liquid is determined by a function that exhibits parabolic rate kinetic. One factor in this function is the differential between the volume fraction of powder within the rubber mold before the isopressure is applied and the volume fraction of powder in the rubber mold after the isopressure is removed. When this differential is small, the time needed to apply the isopressure is very short. This is the case when the initial slurry is first consolidated by pressure filtration. Powders can never be mixed with a liquid to achieve the very high volume fractions, thus their differential would be much greater, and the time to achieve a uniformaly dense and elastic body would be very long.

Second, when the slurry used to fill the rubber mold contains a low volume fraction of powder, then as the liquid is removed during isopressing, the rubber mold undergoes a large shape change to accommodate the large volume change associated during the large increase in powder volume fraction, and the large volume of liquid expelled through the porous material within (or at one end) of the rubber mold. Thus, when the slurry is preconsolidated as in this invention, there is little or no shape distortion of the rubber mold during isopressing.

Third, starting with a slurry containing a low volume fraction of powder is strongly desired because it can be passed through a filter to remove strength degrading inhomogeneities. One can not pass a high volume fraction slurry, e.g., one prepared by mixing powder with the liquid, through a filter.

When the consolidation pressure is increased above a critical value, the force between most of the particles is sufficiently large to push them into touching contact. When this occurs, the consolidated body does not yield when stressed, rather it fractures in a brittle manner. Bodies consolidated above this critical pressure are elastic.

Franks and Lange showed that the critical pressure depended on the interparticle pair potential. [G. V. Franks and F. F. Lange, "Plastic-to-Brittle Transition of Saturated, Alumina Powder Compacts," supra]. When the potential exhibits a long range repulsion, the particles are very easy to push together because although the potential barrier between the particles is large, the slope of the potential as a function of separation distance is very shallow, allowing the force to push the particles together to be very small. Thus, dispersed slurries always produced elastic bodies that fractured before yielding. Slurries formulated with excess salt that sufficiently compressed the Debye length exhibited modest to large critical consolidation pressures. The critical pressure increased with salt content, i.e., when the potential well the particles sat in was made deeper. For these coagulated systems, the slope of the potential curve is large, and thus the force need to push particles over the short-range repulsive barrier created by the addition of salt was very large. Other factors such as the size of the counterion and the particle size are know to effect the critical consolidation pressure that defines the plastic to brittle transition. [G. V. Franks, M. Colic, M. L. Fisher, F. F. Lange, "Plastic-to-Brittle Transition of Consolidated Bodies: Effect of Counterion Size," *J. Coll. Interf. Sci.*, 193 [1] 96–103 (1997); and G. V. Franks, F. F. Lange, "Plastic Flow of Saturated, Consolidated Alumina Powder Compacts: Particle Size and Binary Mixtures," *J. Amer. Ceram. Soc.*, 82 [6] 1595–7 (1999)].

Figure 6:
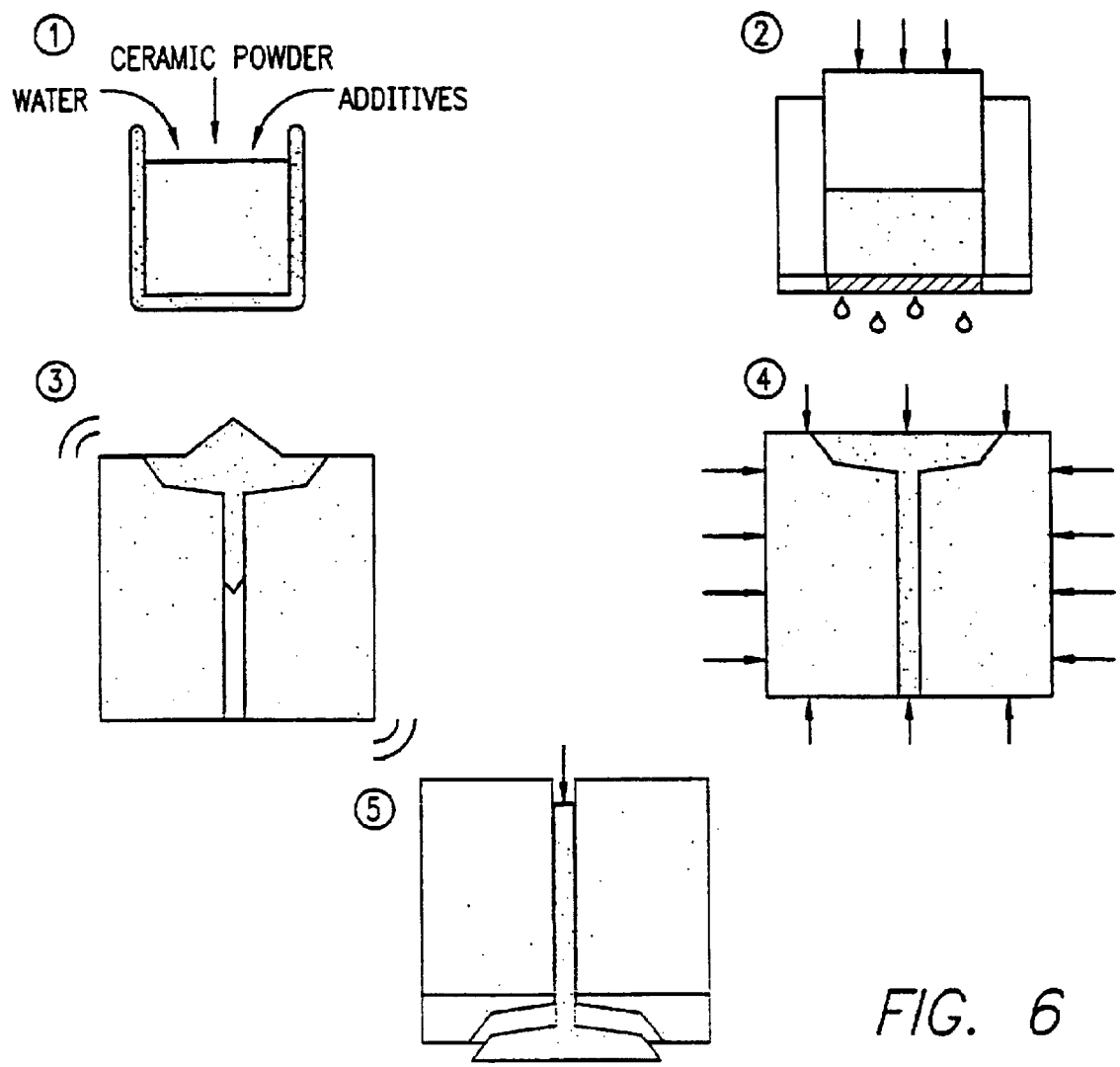
FIG. 6 is a schematic of the colloidal isopress process.

The use of colloidal isopress forming has a number of major advantages. The strength and the reliability of the final product can be increased and in addition the shaping process can be simplified by allowing the use of current ceramic forming equipment. The basic steps of colloidal isopress forming are schematically shown in FIG. 6, showing (1) slurry formation, (2) low pressure consolidation, (3) mold filling, (4) applied isostatic pressure, and (5) part removal. It takes advantage of the benefits of colloidal powder processing [F. F. Lange, Powder Processing Science and Technology for Increased Reliability," *J. Am. Ceram. Soc.*, 72 [1] 3–15 (1989) and V. K. Pujari, D. M. Tracey, M. R. Foley, N. I. Paille, P. J. Pelletier, L. C. Sales, C. A. Willkens and R. L. Yeckley, "Reliable Ceramics for Advanced Heat Engines," *Am. Ceram. Soc. Bull.*, 74 [4] 86–90 (1995 )]. As a colloidal suspension, the slurry can be filtered in its dispersed state prior to forming. Dispersing the slurry breaks weakly bonded agglomerates. Passing the dispersed slurry through a filter removes heterogeneities and hard agglomerates greater than a given size. Filtration reduces the flaw size after sintering and therefore results in an increase in the average strength and in the appearance of a threshold strength. The interparticle pair potential has to be changed from fully repulsive to weakly attractive before the volume fraction of the slurry is increased by consolidation, e. g. via pressure filtration, centrifugation, or osmotic consolidation. [F. F. Lange and K. T. Miller, "Pressure Filtration: Consolidation Kinetics and Mechanics," *Am. Ceram. Soc. Bull.*, 66 [10] 1498–504 (1987); J. C. Chang, B. V. Velamakanni, F. F. Lange and D. S. Pearson, "Centrifugal Consolidation of $Al_2O_3$ and $rO_2/Al_2O_3$ Composite Slurries vs. Interparticle Potentials: Particle Packing and Mass Segregation," *J. Am. Ceram. Soc.*, 74 [9] 2201–204 (1991); J. C. Chang, F. F. Lange, D. S. Pearson and J. P. Pollinger, "Pressure Sensitivity for Particle Packing of Aqueous $Al_2O_3$ Slurries vs. Interparticle Potentials," *J. Am. Ceram. Soc.*, 77 [5] 1357–60 (1994): and K. T. Miller and C. F. Zukoski, "The Osmotic Consolidation of Suspensions and Gels," *J. Am. Ceram. Soc.*, 77 [9] 2473–78 (1994)]. The weakly attractive potential prevents mass segregation and induces plasticity of the powder compact in the consolidated state [G. V. Franks and F. F. Lange, "Plastic-to-Brittle Transition of Saturated Alumina Powder Compacts," *J. Am. Ceram. Soc.*, 79 [12] 3161–68 (1996)]. The consolidation prior to the actual shaping is necessary to reduce the shrinkage during shaping, drying and firing. Higher packing densities allow processing at lower temperatures and lead to less shape distortion during densification. Under appropriate conditions, the slurry is still plastic in the consolidated state and can therefore be shaped using current processing techniques for ceramics such as isostatic pressing, extrusion or injection molding. Due to the fact that the consolidated slurries are suitable for near net shape techniques, machining of the components before or after firing is either unnecessary or can at least be reduced to a minimum. As the higher volume fraction of the shaped parts reduces their shrinkage, it simplifies their drying and sintering.

A weakly attractive interparticle pair potential can be established by overlaying a short-range repulsive potential to the always present van der Waals attraction [F. F. Lange, "Colloidal processing of powder for reliable ceramics," *Solid State+Mat. Science*, 3 [5] 496–500 (1998)]. The combination of these two potentials leads to a resulting potential with a secondary minimum. The depth of this potential well determines the strength of the network. The deeper the potential well, the higher is the force to push the particles out of it [E. P. Luther, J. A. Yanez, G. V. Franks, F. F. Lange and D. S. Pearson, "The Effect of Ammonium Citrate on the Rheology and Particle Packing of Alumina Slurries," *J. Am. Ceram. Soc.*, 78 [6] 1495–500 (1995)]. The secondary minimum separation allows particles to rearrange around each other. There are two general ways to produce a short-range repulsive potential. The first method is based on the decrease of the counterion cloud to a finite volume by adding salt, which changes the repulsive potential from long-range to short-range repulsive. In the second method, the short range repulsion is caused by small molecules attached to the surface. The extent of this steric repulsion depends on the length of the molecule. The molecules have to be strongly bonded to the surface, otherwise they are pushed away from the surface during consolidation [M. Colic, G. V. Franks, M. L. Fisher and F. F. Lange, "Compositionally Dependent Si 2p Binding Energy Shifts in Silicon Oxynitride Thin Films," *J. Am. Ceram. Soc.*, 69 [4] 314–16 (1986)].

The following examples and characterization are associated with this new forming method of the present invention.

ALUMINA EXAMPLES

In the present invention, a modest salt content (0.5 molar $NH_4Cl$) was added to an aqueous $Al_2O_3$ powder slurry formulated a pH 4 to produce the weakly attractive, non-touching particle network with a high plastic to brittle transition. The yield stress of bodies consolidated at 5 MPa was so low that the body was fluid after it was vibrated. The fluidized body was injected into a rubber mold and made elastic by isopressing at pressure greater than the critical pressure. A small amount of water was removed during isopressing to allow the particle network to support the applied pressure. Porosity was either added to the mold in the form of dry, loose powder or as a partially sintered powder compact. It is also possible to incorporate porosity into the mold material itself.

Here, we demonstrate the colloidal isopressing method with the use of counterions and commercial $\alpha$-$Al_2O_3$ powders (Sumitomo Chemical Co., Grade AKP-50, 0.24 $\mu$m diameter; AKP-30, 0.40 $\mu$m; and AKP-15, 0.65 $\mu$m) with an isoelectric point at pH 9.

A well dispersed, 0.20 solid volume fraction slurry was created by sonicating alumina powder in deionized water (initial resistivity ~$17.5 \times 10^6 \Omega$.cm). The alumina powder was slowly added to the water with stirring and sonication (Heat Systems-Ultrasonics, Inc., Sonicator W-380). The sonication of the slurry was intended to break apart agglomerates. Alter sonication, the slurry was allowed to equilibrate for at least 15 minutes with stirring by a magnetic stir bar. At this point, the low viscosity slurry could be passed through a filter to remove heterogeneities. $NH_4Cl$ salt (Fisher Chemical, Fair Lawn, N.J., analytical grade) was then slowly added to the slurry to achieve a concentration of 0.5 mole per liter of water. The pH was maintained at 4 using $HNO_3$. The addition of the $NH_4Cl$ developed a weakly attractive potential between the particles by reducing the extent of electrostatic double layer repulsion. As previously reported by Franks, et al., supra., the addition of 0.5M $NH_4Cl$ to a dispersed alumina slurry produces a plastic-to-elastic transition at a consolidation pressure of 65 MPa. As mentioned above, the plastic-to-elastic transition is a phenomenon that was first observed by Franks and Lange. This invention utilizes the pressure dependent behavior of these slurries to first consolidate at low pressure, plastically reshape the consolidated slurry, and apply higher pressure to form an elastic part. Consolidating below the critical pressure to produce a fluid like material, placing it into a rubber mold, then applying a pressure above the critical pressure was not taught, nor understood in the papers by Franks and Lange.

The slurries were bottled and allowed to equilibrate overnight on a roller mill to maintain agitation. Before use, the pH of the slurries were checked and adjusted to within 0.1 pH units from the desired level. All slurries were processed within one week of initial preparation. Pressure filtration was used to increase the volume fraction of solids in the slurries. A 45 mm diameter cylindrical die made from stainless steel was closed on one end with filter paper (Whatman International, Ltd., Maidstone, England, grade 50) backed by a stainless steel filter. This filter system was able to trap the ceramic particles while allowing the liquid to flow through. The opposite end consisted of a plunger which applied pressure to the slurry when loaded in a hydraulic press (Carver, Inc., Wabash, Ind., Model M). Pressure was maintained until the plunger ceased to move for a minimum of 30 minutes where it was assumed the load applied by the plunger was supported by the particle network [F. F. Lange and K. T. Miller, "Pressure Filtration: Consolidation Kinetics and Mechanics," *J. Amer. Ceram. Soc. Bull.*, 66 [10] 1498–1504 (1987)]. After the slurry was consolidated by pressure filtration at 5 MPa, the powder within the saturated compact had a relative density of 0.575±0.010 (see Table I) and could be made to flow with a rheology that resembles toothpaste after moderate vibration (a compressive flow stress of ≈0.01 MPa).

Once consolidation had ceased, the saturated compact was transferred into a plastic bag. Any network formed during pressure filtration was broken apart by vibration (Cleveland Vibrator Company, Inc., Cleveland, Ohio, Model CM-30). The plastic bag provides a convenient vehicle from which the fluidized, consolidated body can be transferred into a syringe. The syringe allows a precise volume of fluidized body to be directed in a controlled manner. The tip of the syringe was covered with piece of Parafilm to prevent the fluidized, consolidated body from drying out. It was determined that the consolidated slurries could be stored in the syringe for over four months; however most slurries were used within one week of filter pressing.

The fluidized alumina body in the form of a consolidated slurry was extruded into a rubber mold for isostatic pressing, and was vibrated to allow any air bubbles, trapped in the mold during filling, to rise to the surface (the viscosity of these weakly attractive particle suspensions exhibit shear thinning behavior, Franks, J. Am Ceram., Soc. 78, 1324, supra).

Figure 17:
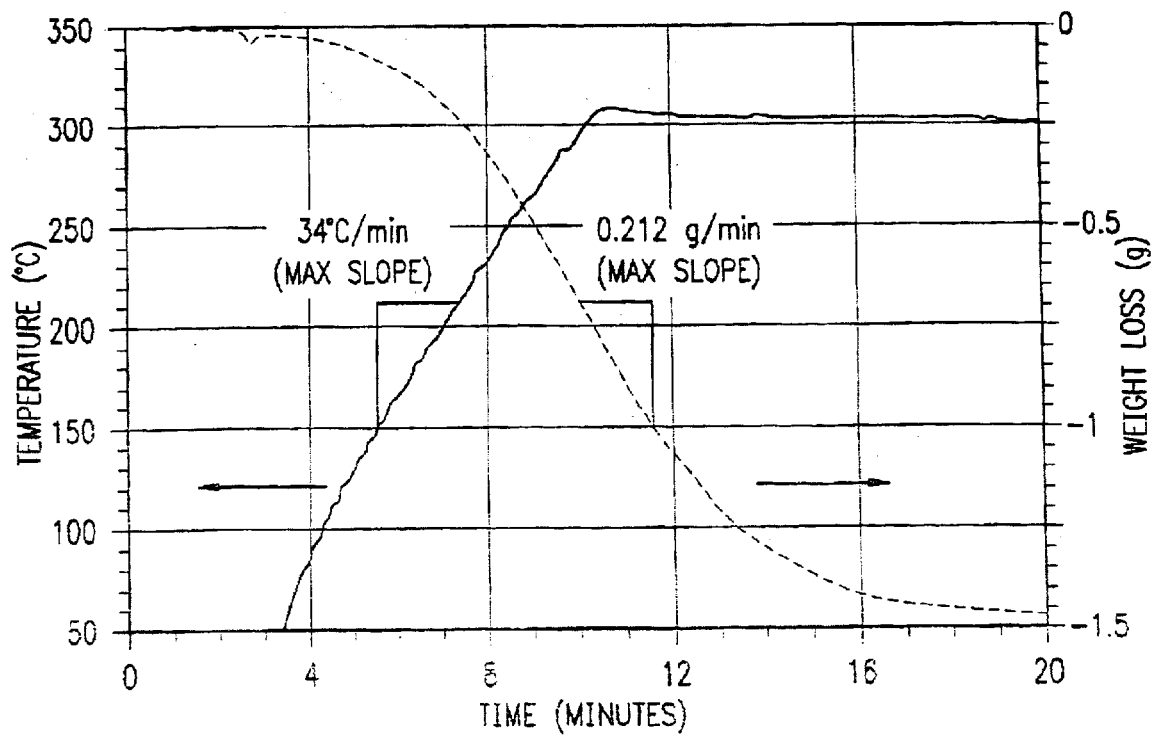
FIG. 17 is a graph illustrating the TGA measurement on drying of an isopressed bar using a heating rate of 30° C. per minute up to 300° C. (all of the liquid in the bar is removed in less than 20 minutes without any damage).

The molds were fabricated by casting silicone rubber (GE Silicones, RTV664) around an appropriate shape. Examples shown in FIGS. 5 and 17 include (FIG. 5) an engine valve used as a proof of concept, and (FIG. 17) a rectangular prism (12.7×6.4 mm in cross section), used to determine the properties of the isopressed material. The mold must contain some porosity to absorb a small amount of water during isopressing; otherwise the liquid surrounding the particles would sustain the applied hydrostatic pressure and shield the particle network. This was achieved by placing a small amount of dry powder or a partially sintered powder compact at one end of the mold cavity. An isostatic pressure in the range of 60 to 300 MPa, much greater than the plastic-to-elastic transition pressure, was applied for a period between 15 seconds to 10 minutes. After iso-pressing, the elastic specimens were ejected from the mold.

Isopressed samples were characterized by their relative density and their mechanical response in compression and bending. The relative density was calculated by the weight loss method. The volume of water was determined by the weight loss of a saturated body after drying at 70° C. for at least 24 hours. The volume of salt (density=1.5 g/cc) was calculated from the weight loss of the dried body after a heat treatment at 500° C. for 3 hours in air. The weight of the body after the heat treatment was used to determine volume of alumina. These data were used to calculate the relative density of the body at different stages of processing.

TABLE 1

Relative densities, for 3 alumina powders with different particle size, before and after isopressing at 300 MPa for 5 minutes. The error in these values is approximately ± 1%

| Material System | Relative Density after Consolidation at 5 MPa | Relative Density after Isopressing at 300 MPa |
| --- | --- | --- |
| Alumina | | |
| AKP-50, 0.2 μm pH 4, 0.5M NH$_4$Cl | 57% | 62% |
| AKP-30, 0.40 μm pH 4, 0.5M NH$_4$Cl | 58% | 64% |
| AKP-15, 0.65 μm pH 4, 0.5M NH$_4$Cl | 58% | 54% |

The relative density after isopressing was independent of the isopressure for periods ≧20 seconds. For shorter periods of the lowest pressure (100 MPa), the end furthest from the dry powder was still plastic, indicating that the hold time was insufficient to transport water through the entire 50 mm long bar. The differential equation developed by Darcy to describe the flow of a liquid through a porous body can be used to determine the minimum time needed to produce an elastic body throughout the mold cavity. Application of Darcy's Law reveals that the very short period needed to convert the fluid paste to an elastic compact is primarily due to the very small change in relative density (see Table 1) after the short isopressing period. That is, only a small amount of liquid needs to be removed to convert the fluid paste to an elastic body.

The mechanical behavior of isopressed, saturated bodies were determined with uniaxial compression and 3-point bending experiments. Unconfined, uniaxial compression tests were performed on cylindrical bodies immediately after forming. The specimens were tested inside a plastic bag containing a small piece of water saturated paper towel to prevent drying. A displacement controlled mechanical testing machine (Instron, Canton, Mass., Model 8562) was used at a displacement rate of 1.0 mm/min. Engineering stress and strain were calculated from the load-displacement data.

The flexural strengths of the saturated green bodies were determined in 3-point bending. 4-point loading was not used because of the low strength and low toughness of the isopressed bodies. Bend bars were prepared in a mold with a rectangular cross section. The dimensions of the specimens were 50×6.3×12.2 mm. The loading span was 42.2 mm. Bars were tested immediately after isopressing in a humid environment to minimize drying during the measurement. All bend tests were performed on the displacement controlled Instron 8562 coupled with a 44.5N load cell (Eaton Corp., Troy, Mich., model 3108-10). A displacement rate of either 0.5 or 1.0 mm/min was used.

Figure 4:
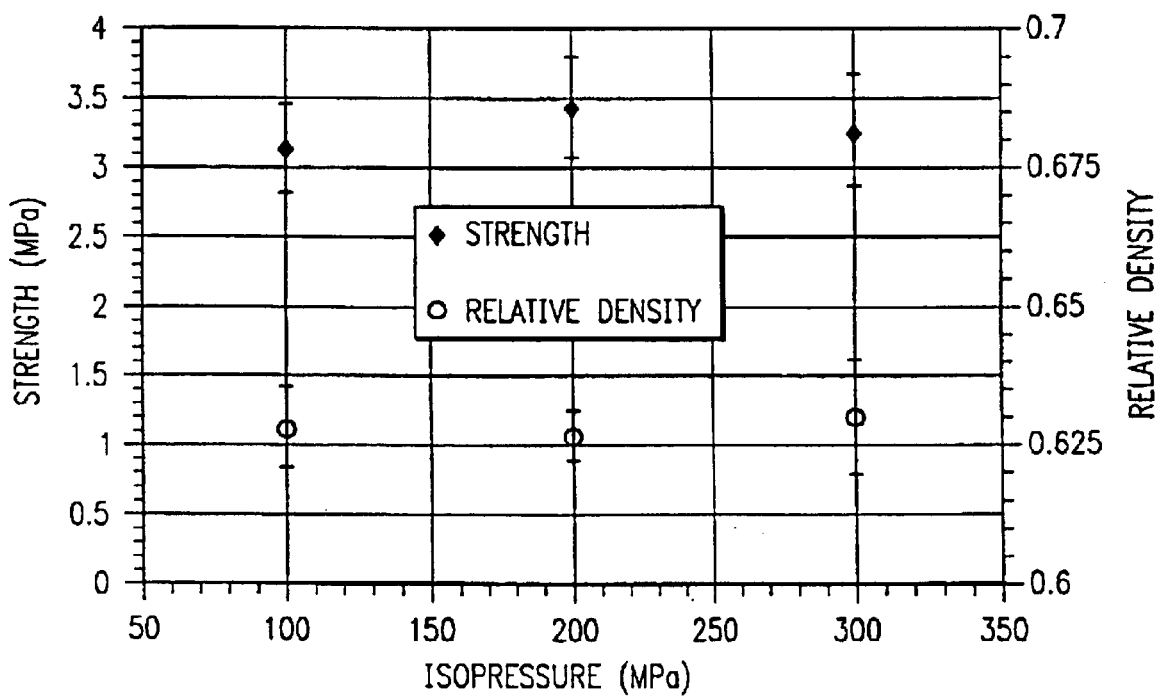
FIG. 4 is a graph illustrating the 3-point bending strength and relative density of compacts at various applied isopressures for AKP-50, (0.24 μm) alumina at 0.5M NH$_4$Cl, and pre-consolidated at 5 MPa.

The saturated strength of bars (12.7×6.4×50 mm) formed with the colloidal isopressing method was measured in 3-point bending. Efforts to minimize loss of water from the consolidated body were made by testing in a humid environment immediately upon removal from the mold. The strength and relative density as a function of applied isopressure for alumina compacts composed of the finest particle size (AKP-50) are shown in FIG. 4. Both the strength and relative density were invariant with respect to the applied isostatic pressure in the range between 100 MPa and 300 MPa. These observations indicate that a stable particle network is achieved at an isopressure of 100 MPa and that the network does not change with increased pressure. It should be noted that the strengths reported in FIG. 4 are nearly identical to those for dry pressed alumina bars containing a polymer binder tested in flexure (3–4.5 MPa) [D. C. C. Lam, K. Kusakari, "Microstructure and mechanical properties relations for green bodies compacted from spray dried granules," J. Mater. Sci. 30, 5495 (1995)]. This is significant because the isopressed bodies studied here did not require any polymer binder to achieve the same high green strengths.

Figure 5:
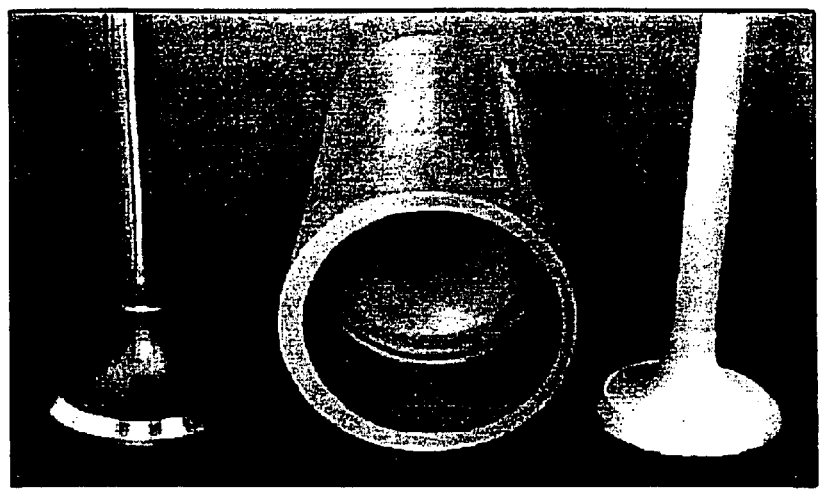
FIG. 5 shows an isopressed component from AKP-50 alumina: a metal engine valve (left), a silicone rubber mold cast from the metal part (center), and a sintered alumina valve (right)
Figure 16:
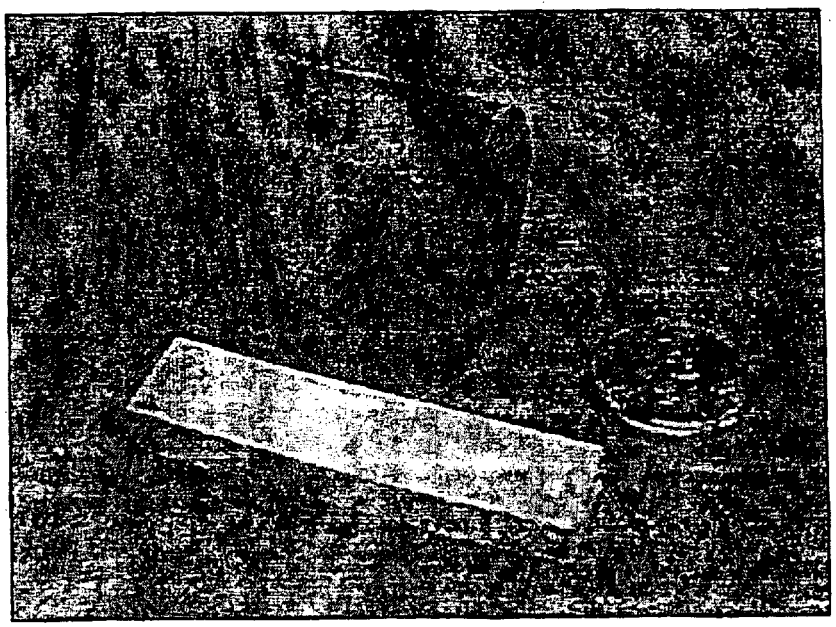
FIG. 16 shows a dried alumina bar formed in the silicone mold pictured above it, according to the method of the present invention.

It was observed that the surface of the mold transferred extremely well to the isopressed body as indicated by the engine valve produced with the colloidal isopressing method (FIG. 5). The silicone rubber mold (center) was cast around a metallic engine valve, and a porous piece of alumina (not pictured) was used against the base of the valve to accommodate fluid squeezed out during isopressing. The component produced from this mold (far right) has been sintered and is smaller due to shrinkage associated with densification. However, it is clear that the corners and surfaces were all transferred to the isopressed component very well. Similarly, the bar shaped compact in FIG. 16 has the same shape as the mold cavity. The corners remain sharp and edges true because the change in volume during shape forming is minimized.

it was determined that the isopressed bodies maintain their shape during drying and sintering. Saturated specimens placed directly into a 70° C. drying oven never cracked during drying, and no shrinkage was detected (within 0.3 percent of linear dimension). Rapid drying under controlled heating rates, from room temperature to 300° C., was monitored by thermogravimetric analysis for bar specimens (12.7×6.4×50 mm). Rates up to 30° C. per minute were not found to cause any damage, while a few specimens dried at 40° C. per minute shattered. FIG. 19 shows a 30° C./min drying run; the maximum rate of weight loss is about 14% of the total liquid weight per minute. With this temperature cycle, the bar is dried in less than 20 minutes. This allowed saturated samples to be placed directly into a furnace and sintered to theoretical density all in one step. Eliminating the need for a separate drying and/or burnout cycle would significantly improve processing rates and production costs.

All evidence suggests that the lack of shrinkage during drying is due to the high relative density achieved during isopressing. Namely, the particles are pushed into elastic contact during isopressing, and the capillary pressure produced during evaporative drying is too small to further rearrange the particles. Uniform shrinkage and the absence of either shape distortion or cracking were found after sintering of alumina pieces at 1500° C. for 2 hours. This is indicative of uniform particle packing throughout the bodies; otherwise less dense regions would exhibit greater shrinkage during densification, leading to warping. By reducing any shape changes during post-forming processes, machining of dense components is minimized or eliminated altogether.

RESULTS FOR ALUMINA EXAMPLES

Relative Densities

Pressure filtration of approximately 120 ml of slurry at 5 MPa required about 3 hours to reach equilibrium. The relative density of the pressure filtered bodies was 0.57±0.01. These consolidated bodies were easily deformed and could be fluidized to fill a syringe. The relative density of material extruded from the syringe was determined to be identical to the pressure filtered bodies.

After isopressing, the bodies parted from the mold because of the larger strain recovery of the rubber relative to the powder compact. The relative density was found to increase to an average value of 0.62±0.01 independent of the isopressure (between 100 to 300 MPa) that was held for 1 to 5 minutes.

Shape Forming Capability

FIG. 5 shows a sintered alumina car valve formed by colloidal isopressing. The rubber isopress mold is also pictured (center), along with the original metal valve (left). The chamfer around the head of the original valve was transferred with high fidelity to the sintered body. The relative density of the sintered, colloidally isopressed bodies are ≧0.99.

Packing Density

Previous experiments with the same powder used here have shown maximum relative density of a consolidated dispersed slurry is 0.61±0.01. [G. V. Franks and F. F. Lange, "Plastic-to-Brittle Transition of Saturated, Alumina Powder Compacts," J. Amer. Ceram. Soc., 79 [12] 3161–68 (1996); and J. C. Chang, B. V. Velamakanni, F. F. Lange, D. S. Pearson, "Centrifugal Consolidation of $Al_2O_3$ and $Al_2O_3$/$ZrO_2$ Composite Slurries vs. Interparticle Potentials: Particle Packing and Mass Segregation," J. Amer. Ceram. Soc., 74 [9] 2201–4 (1991)]. The lower relative density of the body produced from the weakly attractive particle network and pressure filtered at 5 MPa appears identical to results of previous experiments. The short range repulsive interparticle potential achieved by the addition of salt persists after pressure filtration and allows the compact to flow under vibration or extrusion. This provides two benefits: (1) the consolidated slurry can be easily and quickly injected into the mold cavities; and (2) the viscosity is low enough to allow air bubbles to rise up to the top when the filled mold is either vibrated or tapped. The extrudability of the consolidated slurry from a syringe, combined with its long term stability allows multiple isopressed bodies to be made from a single, large volume of pressure filtrated material; this is analogous to practice in the traditional clay based ceramic industry.

The relative density of the alumina compacts increased from about 0.57 to about 0.62 during isopressing. The volume change and linear shrinkage associated with this change in relative density is 7% and 2.3%, respectively. Some fluid needs to be expelled during isopressing to allow the applied pressure to be transmitted to the particle network. This way, particles can be pushed into touching contact to create an elastic compact. During our experiments, the amount of fluid that was expelled was controlled by dry powder that was placed at one end of the rubber cavity. The amount of dry powder added to adsorb the expelled water could be used to control the relative density after isopressing. Excess dry powder was used in the current experiments as evidenced by the fact that the relative density was insensitive to the applied pressure.

The maximum amount of shrinkage during isopressing is minimized by the pressure filtration step prior to isopressing. Isopressing times are also reduced due to the moderately high packing density of the fluidized body. Some shrinkage during the isopressing can be advantageous. During isopressing, as the particle network increases its relative density, the rubber mold will compress. When the isostatic pressure is released, both the mold and compact will recover elastic strain. Because the modulus of the rubber is lower than that of the saturated body, and the body undergoes some consolidation during isopressing, the mold will recover a greater amount of strain. This helps to separate the formed part from the mold, easing sample ejection.

Strength

Figure 2A:
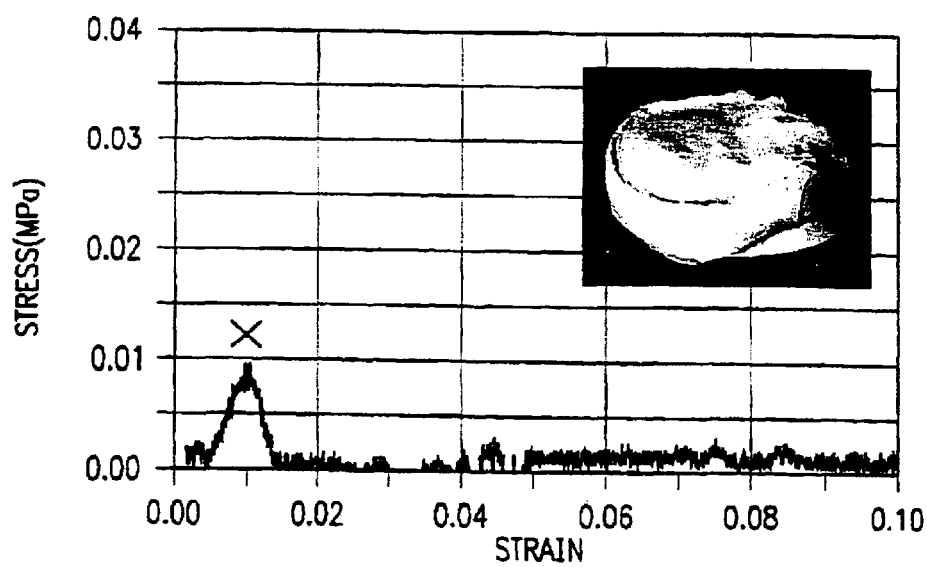
FIGS. 2a–b are plots showing the engineering stress-strain for saturated alumina compact filter pressed at 5 MPa (FIG. 2a) and for saturated alumina compact, extruded after an initial 5 MPa consolidation and isopressed at 300 Mpa for 5 minutes (FIG. 2b)
Figure 2B:
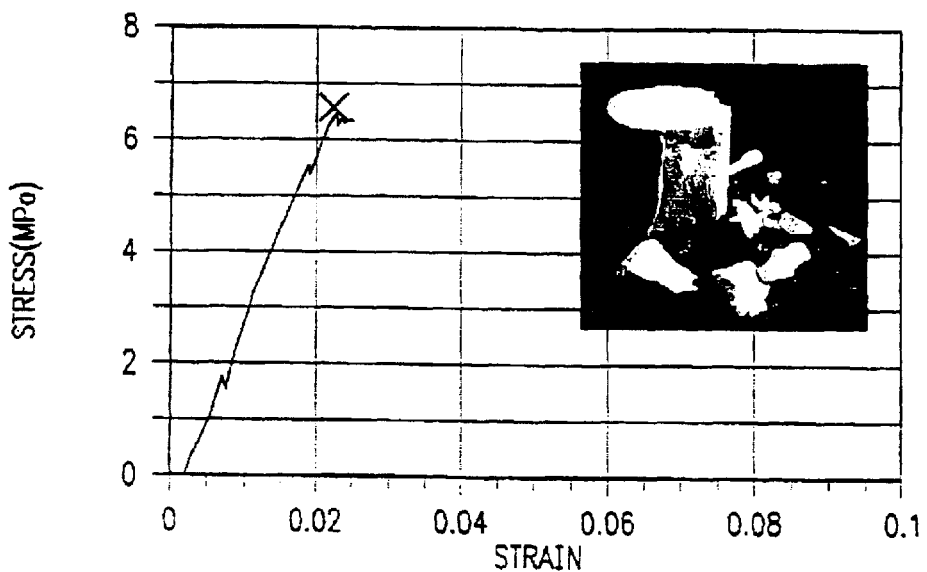

Uniaxial compressive strengths were measured for alumina slurries after pressure filtration and isopressing. FIG. 2 shows the engineering stress-strain plots for saturated alumina: (FIG. 2a) after pressure filtration at 5 MPa and (FIG. 2b) after isopressing at 300 MPa. The filter pressed body shows a low peak stress (near 0.01 MPa) before dropping to a flow stress that is near zero. After isopressing at 300 MPa, the saturated alumina compact had a peak stress near 6.5 MPa before cracks appeared as shown in the insert. The stress does not fall immediately to zero at failure because pieces of the specimen remain between the platens to support the load.

Qualitatively, bodies compressed uniaxially will either flow in a plastic manner, or fracture as an elastic solid. Quantitatively, the deformation can be characterized by the peak stress that is sustained prior to either flow or fracture. Consolidated bodies formed by pressure filtration at 5 MPa have very low peak stresses, followed by flow at nearly zero applied stress. After isopressing at 300 MPa, the behavior changes dramatically, increasing in peak stress by more than an order of magnitude. The isopressed cylinder also fractures at the peak load, indicating the transformation from plastic to brittle elastic. Although the increased relative density between the pressure filtered and isopressed bodies will effect this change from plastic to elastic, previous experiments have shown that the plastic to elastic transition is not dependent on the relative density, but dependent on whether or not the particle are forced into contact.

Figure 3:
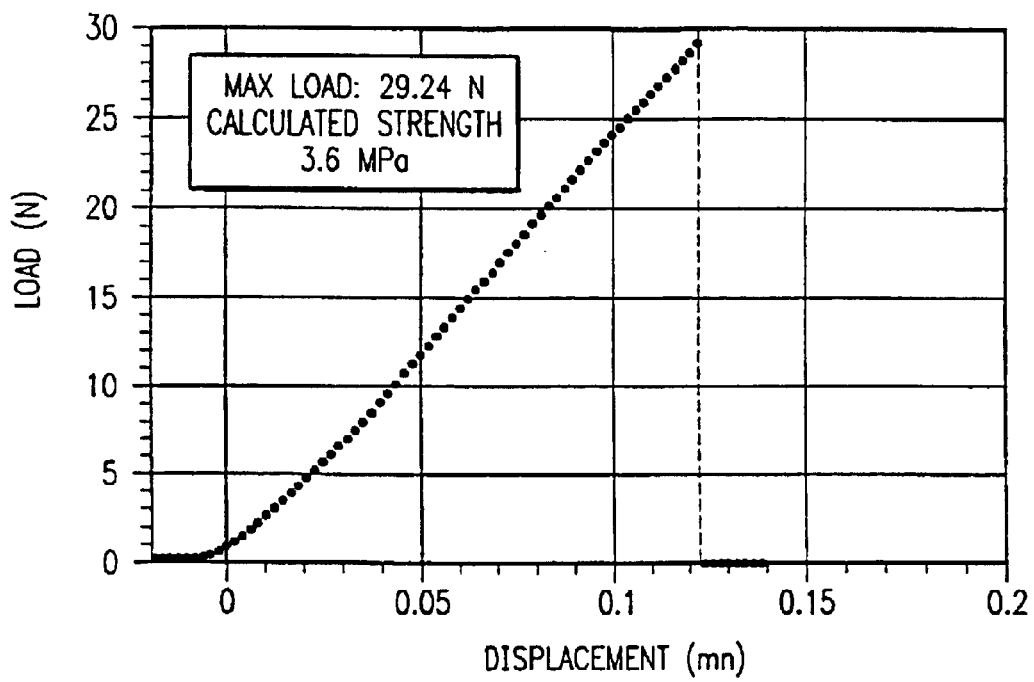
FIG. 3 is a plot of the load-displacement for 3-point bending of a saturated alumina bar isopressed at 200 MPa for 5 minutes.

Three point bending tests were performed on isopressed, saturated bars. Strengths were calculated from the maximum load the bars sustained before fracture. A typical load-displacement curve is shown in FIG. 3. The linear slope of the load-displacement curve during loading illustrates the elastic behavior of the isopressed bodies. The sharp drop of the load at fracture also indicates that no major plastic deformation occurred at failure. Visual inspection of broken bars did not indicate any deformation at the loading points. The compiled bending strengths for bars isopressed at 100 to 300 MPa for 5 minutes are shown in FIG. 4.

In bending, we expect the strength to depend strongly on the particle structure. As illustrated in FIG. 4, the bending strength does not vary for bodies isopressed between 100 to 300 MPa. Because the packing densities of these bodies all fall within the same statistical error, our observations indicate that the structure of the particle network formed is the same for all isopressures studied. An equilibrium network has formed by an isopressure of 100 MPa that does not change at higher pressures (up to 300 MPa).

The isopressed alumina bars behave in an elastic manner. This is supported by the linearity of the load-displacement curve depicted in FIG. 3. Elastic-brittle behavior has also been reported in dry pressed, spray dried alumina powder with a polymeric binder. The strength of a dry body with the addition of a binder can achieve values of 3 MPa. [D. C. C. Lam, K. Kusakari, "Microstmucture and mechanical properties relations for green bodies compacted from spray dried granules," J. Mater. Sci. 30, 5495 (1995)] However, this binder material must be carefully and completely removed prior to densification to prevent the formation of flaws. The strengths measured in this work for saturated, isopressed compacts are approximately the same. No binders were used in the present studies.

Conclusions from Alumina Examples

The foregoing examples demonstrate that colloidal isopress forming is a viable technique for shaping colloidal ceramic powders from their slurry state. Aqueous, alumina slurries with sub-micron size powder have been successfully reshaped into cylinder, bar and engine valve geometries. The short-range interparticle repulsive potential allows the slurry to be consolidated to a moderately high volume fraction that can still be fluidized by vibration. Because there are multiple methods to achieve the appropriate interparticle interaction, this process has the potential for application to many different material systems including yttria stabilized zirconia, pure silicon nitride, and silicon nitride combined with sintering aides. [S. Klein, M. L. Fisher, G. V. Franks, M. Colic, and F. F. Lange, "Effect of Interparticle Pair Potential on the Rheological Behavior of Zirconia: Part I—Electrostatic Double Layer Approach," submitted to J. Amer. Ceram. Soc. T. Kramer and F. F. Lange, "Rheology and Particle Packing of Chem- and Phys-Adsorbed, Alkylated Silicon Nitride Powders," J. Amer. Ceram. Soc., 77 [4] 922–8 (1994); and R. Joray, B. C. Yu, J. Pollinger and F. F. Lange, "Optimization of AS800 for colloidal isopress forming," submitted to the J. Amer. Ceram. Soc.]

Shaped bodies of alumina have been formed in less than a minute with a high relative density (0.62). The saturated, isopressed bodies have a high strength (3 MPa), comparable to dry pressed powders with binders, without the addition of a binder. Surface features are reproduced with high fidelity, allowing net shape processing. The ability to use filtered slurries allows the realization of the full potential of colloidal processing in the reduction of flaw size and improvement of component reliability. The advantages over current colloidal shaping techniques include short processing periods within the mold, high relative density, and uniform green bodies with high strengths. Finally, this new process uses capital equipment already found in ceramic processing, including dewatering filter presses and cold isostatic presses.

SILICON NITRIDE EXAMPLES

Silicon nitride particles have two major surface sites, silanol sites (—Si—OH) and secondary amino sites (—$Si_2$=NH) [R. K. Brow and C. G. Pantano, "Chemisorption of Organofunctional Silanes on Silicon Nitride for Improved Aqueous Processing," J. Am. Ceram. Soc., 81 [8] 2157–63 (1998)]. There are some problems involved with the aqueous processing of silicon nitride due to the dissolution of the silanol groups in water [L. Bergstrom and E. Bostedt, "Surface Chemistry of Silicon Nitride Powders: Electrokinetic Behavior and ESCA Studies," Colloids Surf., 49 183–97 (1990)]. Efforts have been made to stabilize aqueous silicon nitride slurries for economic and ecological reasons. Colic et al., supra, showed that the reaction of water with the silicon nitride surface can be substantially decreased by chemisorbing organofunctional silanes to the silanol sites. McGovern et al., state that octadecyltrichlorosilane (OTS) adsorbs to a silica surface in a three step process [M. E. McGovern, K. M. R. Kallury and M. Thompson, "Role of Solvent on the Silanization of Glass with Octadecyltrichlorosilane," Langmuir, 10 [10] 3607–3614 (1994)]. First the chloro moieties are hydrolyzed near the substrate surface. Then this silanetriol group physisorbs onto the substrate surface by forming hydrogen bonds. In the third step, covalent $Si_{substrate}$—O—$Si_{silane}$ and $Si_{silane}$—O—$Si_{silane}$ bonds are formed, chemadsorbing the silane to the surface and the silane molecules to each other. The coated silicon nitride particles need to be fully dispersed prior to the filtration and then coagulated afterwards. This can only be done with charging surfactants. The addition of salt to a slurry of particles coated with charging chains neutralizes the surface sites and the chains which causes the chains to coil up. This allows the repulsion of charged organosilane molecules to extend a greater distance than the repulsion associated with uncharged, adsorbed molecules of the same length.

The coating of silicon nitride with an organofunctional silane slows down the dissolution of the silanol groups in water and provides a combined steric and osmotic short-range repulsion. Hence water-based slurries of silicon nitride coated with a large enough amount of organofunctional silanes should be suitable for colloidal isopress forming.

All the experiments were done with AS800, a commercial slurry from Allied Signal, Inc. Slurries from three different batches were used, named batch A, B and C. The solid content of the slurry was primarily silicon nitride, plus small amounts of proprietary additives. The added organosilane is PEG-silane ($C_{10}H_{21}NO_4SiO(CH_2CH_2O)_{4-6}H$). Its chemical name is N-[(triethoxysilyl)propyl]-O-polyethylene oxide urethane and it has a molecular weight of 400 to 500. The PEG-silane was purchased from Gelest Inc., Tullytown, Pa. Since the PEG-silane is easily hydrolyzed under the influence of atmospheric humidity and may then polymerize, it was stored in an argon atmosphere. To guarantee a sufficient steric and electrostatic repulsion, the percentage of PEG-silane was increased to an amount of 2 wt % of the solid content. Salt was added to compress the electrostatic double layer and create a weakly attractive interparticle pair potential. Two different salts were used, tetramethylammonium chloride (TMACl) and tetramethylammonium nitrate ($TMANO_3$). Tetramethylammonium chloride, 97% and tetramethylammonium nitrate, 96% were purchased from Sigma Aldrich, Milwaukee, Wis. The pH was adjusted by adding either nitric acid ($HNO_3$) or tetramethylammonium hydroxide (TMAOH).

The zeta potential was calculated from the measured velocity of the particles under an applied electric field in a dilute suspension at a specific pH (Zeta Meter System 3.0, Zeta Meter Inc., Long Island City, N.Y.). AS800 slurries with an increased PEG-silane content of 2 wt % were diluted to a powder concentration of 0.025 g/L. Before each set of measurements, the solution was sonicated at pH 11 using an ultrasonic horn (Sonicator, Ultrasonic Liquid Processor, Model W-380, Heat Systems—Ultrasonics Inc., Piscataway, N.J.). The velocity of the particles was first measured at the same pH, then the pH was decreased step by step by adding $HNO_3$. The applied voltage was 75 volts.

Viscosity measurements were made with a dynamic stress rheometer (Dynamic Stress Rheometer DSR, Rheometrics Inc., Farmingdale, N.Y.) using a cup and couette measuring cell (cup diameter 32.0 mm, bob diameter 29.5 mm, bob length 44.0 mm. For slurries with different salt concentrations (0.0 M, 0.1 M, 0.25M, 0.50 M, 0.75 M and 1.0 M) the dependence of the viscosity on the strain rate was measured. In order to make viscosity measurements with the DSR, the as received slurries had to be diluted to a solid content of 20 vol %. All measurements were started at the highest strain rate.

The slurries were consolidated by pressure filtration (FIGS. 7a–b) [F. F. Lange, Am. Ceram. Soc. Bull., 66 [10] 1498–504 (1987), supra]. The used cylindrical dies had a diameter of 25.4 mm or 45.0 mm. Using a laboratory press (Carver Laboratory Press, Fred S. Carver Inc., Menomonee Falls, Wis.), a constant pressure was applied to the particle network in the slurry until the consolidation was terminated. The applied pressures ranged from 0.5 MPa to 50 MPa. The equilibrium packing density was reached when the plunger stopped moving (when there was no recognizable movement of the plunger for at least one hour).

After pressure filtration, some consolidated slurries were fluidized and then characterized via dynamic rheology (Dynamic Stress Rheometer DSR, Rheometrics Inc., Farmingdale, N.Y.) using a vane tool (cup diameter 32.0 mm, bob diameter 16.0 mm, bob length 31.0 mm). To prevent the fluidized body from drying during the measurement, it was covered with a layer of mineral oil.

Dynamic frequency sweep tests were performed to measure the shear modulus and dynamic stress sweep tests to determine the yield stress [J. A. Yanez, T. Shikata, F. F. Lange and D. S. Pearson, "Shear Modulus and Yield Stress Measurements of Attractive Alumina Particle Networks in Aqueous Slurries," *J. Am. Ceram. Soc.*, 79 [11] 2917–24 (1996) and Q. D. Nguyen and D. V. Boger, "Yield Stress Measurement for Concentrated Suspensions," *J. Rheol. (N.Y.)*, 27 321–49 (1983)]. The yield stress was defined as the stress at which G' starts to decrease substantially during a dynamic stress sweep test. The shear modulus was determined by measuring the storage modulus G' at a stress much lower than the yield stress, at which the network shows elastic behavior. The measurements were taken after designated periods in order to be able to study the time-dependence of the shear modulus and the yield stress.

In addition, uniaxial compression tests were carried out on the filter pressed powder compacts saturated with water (diameter 25.4 mm, length varying from 25.3 to 27.4 mm). The specimens were stored in a plastic bag containing a wet paper towel in order to prevent them from drying. A mechanical testing machine (Instron 1123, Instron Co., Canton, Mass.) with a 5,000 lb. load cell was used for these measurements. All specimens were tested with a loading rate of 1 mm/min and within one hour after the consolidation. "True stresses" and engineering strains were calculated from the obtained load-displacement data. The engineering strain was calculated by dividing the displacement by the initial height of the sample, the true stress by dividing the load by the current cross-sectional area of the specimen. The current cross-sectional area of a sample was estimated by assuming a constant volume and a uniform deformation ($A_c h_c = A_0 h_0$). The maximum observed true stress was considered to be the peak stress.

Further consolidated slurries with appropriate compositions were liquefied by hand or by vibrating them for a few minutes on a vibrator table (CM-30, Cleveland Vibrator Company, Cleveland, Ohio). The liquefied bodies were then injected into silicone rubber molds, containing a rectangular cavity. The filled molds were placed into an isostatic press (Model #IP-2-22-60, Autoclave Engineers Inc., Erie, Pa.). Partially sintered alumina pieces, within the silicone mold, were used as porous bodies to remove excess water from the fluidized bodies during isopressing.

The relative densities of the specimens in the filter pressed and the isopressed states were determined with the weight difference method. To quantify the residual amount of water the samples were weighed before and after drying at 70° C. The measurement of the weight loss during burnout of the samples at 400° C. or 500° C. allowed to estimate the residual amount of organic additives in the specimens after the consolidation.

Results of Silicon Nitride Examples

Figure 8B:
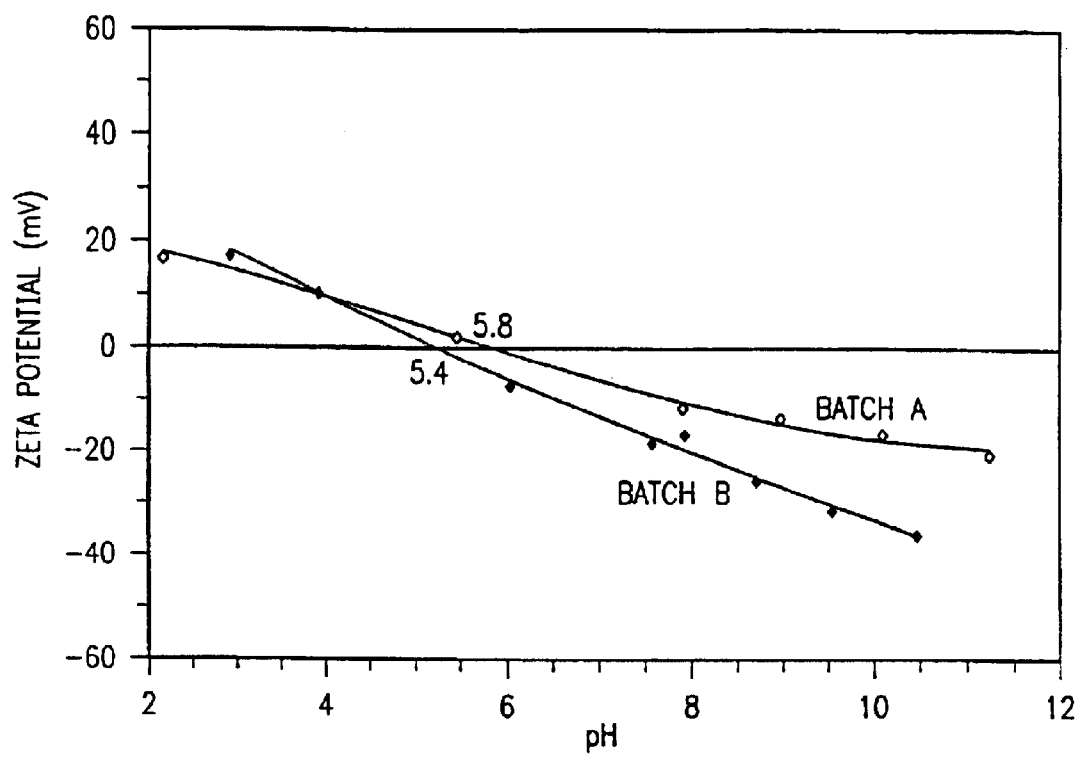

The zeta potential and the isoelectric point of the AS800 from batch A reacted with 2 wt % PEG-silane are reported in FIG. 8(a), measured two weeks and seven weeks, respectively, after its preparation at Allied Signal. These data show a distinct change in the zeta potential over the five weeks period. The zeta potential was also observed to vary from batch to batch, as shown in FIG. 8(b) for batch A and batch B. The zeta potential of the AS800 from batch A was measured two weeks after its preparation, the one from batch B one week after its preparation. Despite the variation of the zeta potential with time and from batch to batch, the isoelectric point (iep) was found to be pH 5.5.

Figure 9A:
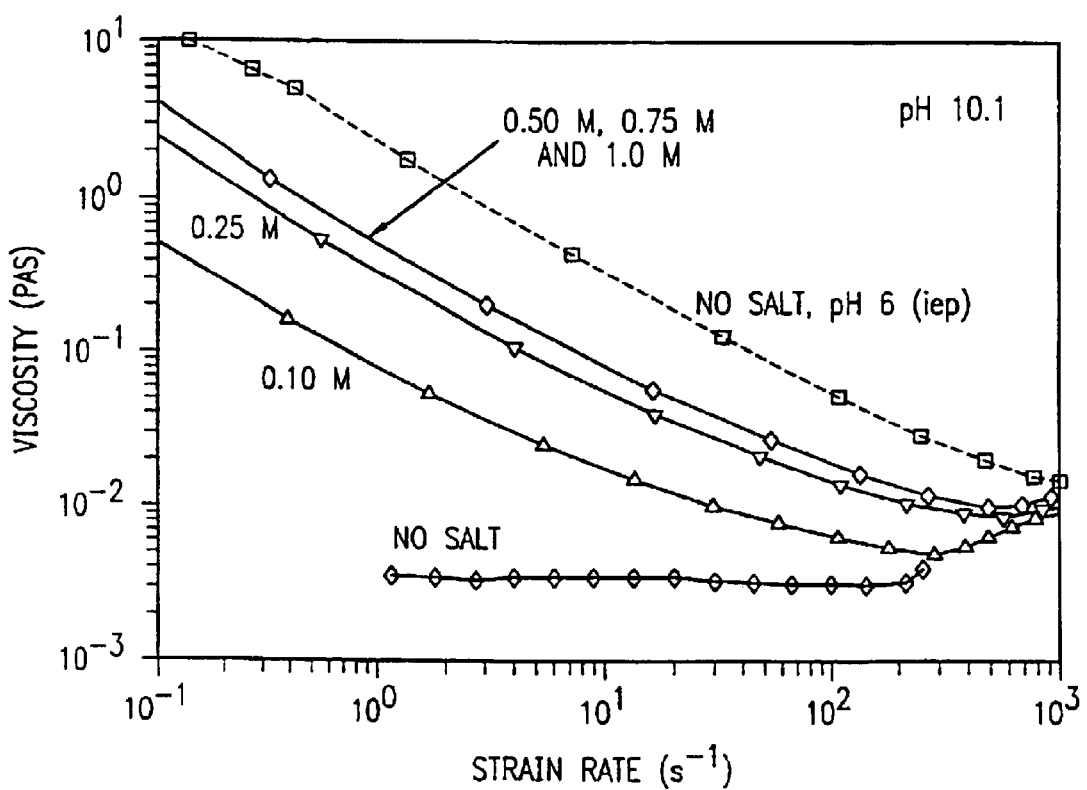
FIGS. 9a–b are graphs illustrating the viscosity of AS800 (batch A, 2 wt % PEG-silane) diluted to 20 vol % in the flocced state at pH6, in the dispersed state at pH10.1 at different concentrations of TMACl (FIG. 9a) and in the dispersed state at pH10.1 at different concentrations of TMANO$_3$ (FIG. 9b)
Figures 9B, 10:
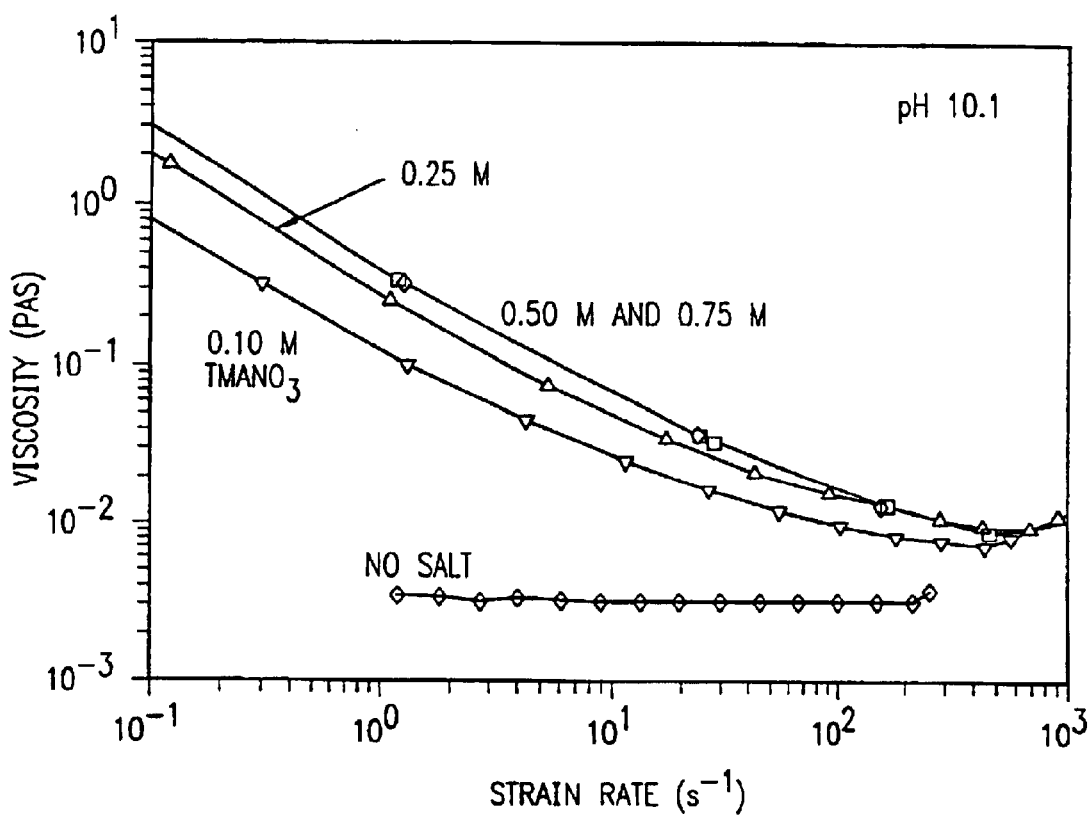
FIG. 10 is a table listing the shear moduli and yield stresses of consolidated slurries for different compositions.

Viscosity versus strain rate curves were measured for diluted slurries of AS800 reacted with 2 wt % PEG-silane (batch A, diluted to 20 vol %), in the flocculated state with no added salt at pH 6 (close to the isoelectric point) and in the dispersed state at pH 10.1 plus the addition of different concentrations of TMACI (FIG. 9(a)) or TMANO$_3$ (FIG. 9(b)). The slurry in the dispersed state without added salt showed a very low viscosity and a nearly Newtonian behavior. In the flocced state the AS800 slurry had a very high viscosity and exhibited strong shear thinning behavior. The addition of salt to a dispersed system causes an increase in the viscosity and a change from nearly Newtonian behavior to shear thinning behavior. Adding TMACI or TMANO$_3$ in excess of 0.5 M did not change the viscosity further.

Figure 11:
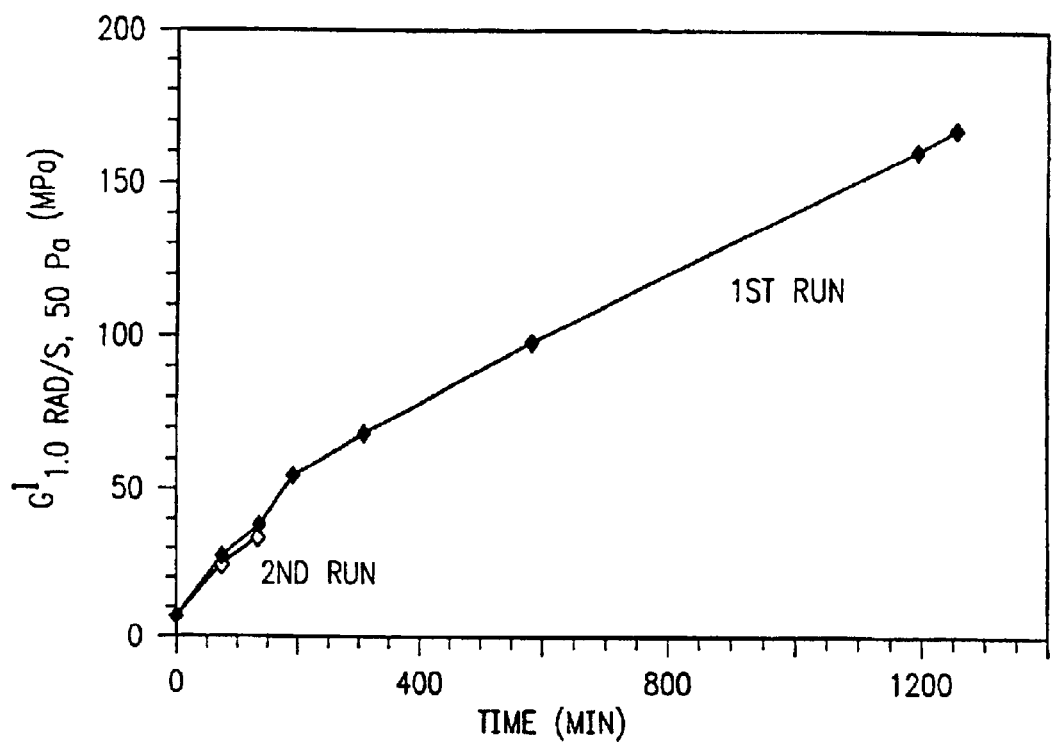
FIG. 11 is a graph illustrating the increase of the shear modulus with time for a consolidated body of AS800 (batch C) with 2 wt % PEG-silane and 0.5M TMANO$_3$ with a consolidation pressure of 2 MPa.
Figure 12:
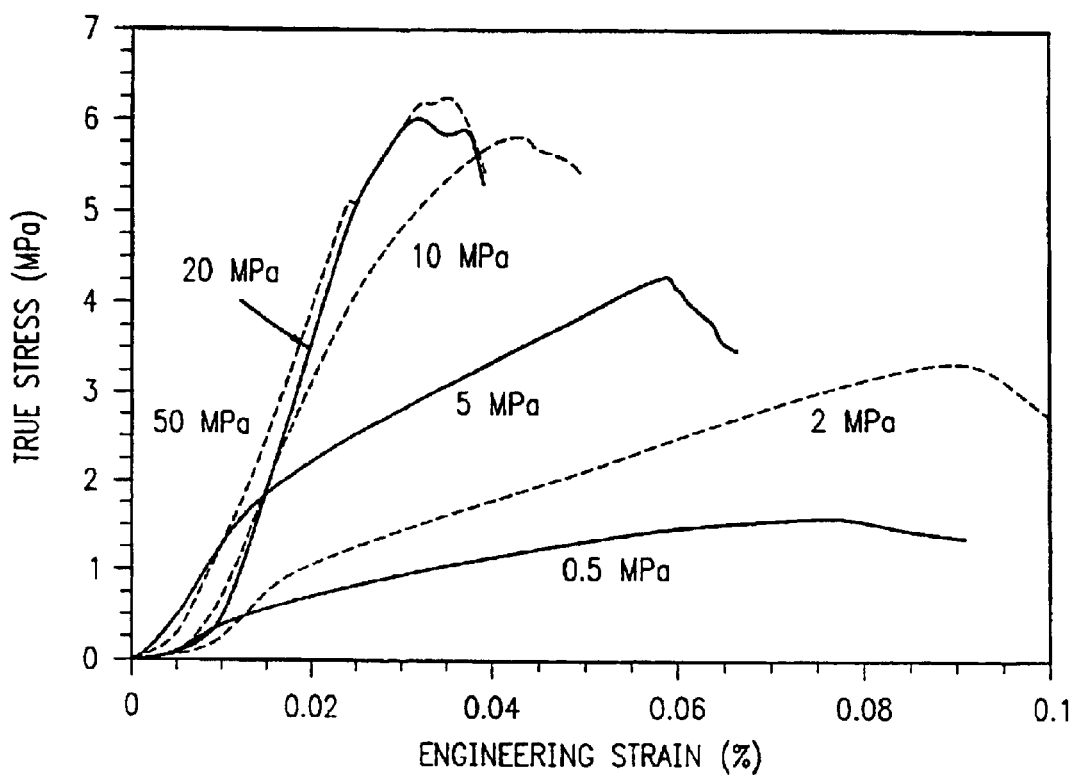
FIG. 12 is a graph illustrating the true stress versus the engineering strain curves for different consolidation pressures (AS800, batch B, 2 wt % PEG-silane, 0.5M TMANO$_3$, loading rate of 1 mm/min.

FIG. 10 shows the values for the initial shear moduli and the average yield stresses of AS800 slurries consolidated at 2 MPa and then fluidized. All data in FIG. 10 was obtained by dynamic stress sweep experiments at a frequency of 1.0 rad/s. The shear moduli plotted in FIG. 10 were measured immediately after the vane tool had been plunged into the slurry. The yield stresses measured at different times exhibited a high variance. The values for the yield stresses in FIG. 10 are averages of the measured values determined at different times. The shear moduli were determined with increasing rest periods within the instrument by performing frequency sweep tests at a frequency of 1.0 rad/s and a stress of 50 MPa. The time-dependence of the shear modulus for a specimen from batch C which contained 2 wt % PEG-silane and 0.5 M TMANO$_3$ is shown in FIG. 11. This material had been filter-pressed at 2 MPa and then fluidized. After the slurry was liquified again by oscillating the vane tool 21 hours after the measurement had been started the shear modulus dropped again to the initial value and showed a similar increase with time as in the beginning (2nd run in FIG. 11). The yield stresses did not show a dependence on the length of time between the immersion of the vane tool and the start of the measurement.

Although the specimens consolidated at 2 MPa could be liquefied either by hand or by use of a vibrator table, they did not start to flow when loaded in uniaxial compression at a displacement rate of 1 mm/min. But their behavior was nevertheless different than truly brittle specimens, as shown in FIGS. 12 and 13a–c. The bodies consolidated at a pressure higher than 5 MPa showed a steeper slope in the elastic regime, higher peak stresses and cracked much more than those consolidated at a pressure 5 MPa. Pieces of the specimens consolidated at 5 MPa could be liquefied after mechanical testing, whereas the pieces from the bodies consolidated at higher pressures only broke into smaller and smaller pieces during vibration.

The relative densities after pressure filtration at 2 MPa and, where possible, after isopressing at 200 MPa for one minute with different compositions are shown in FIG. 14. The relative density of the as received AS800 was measured to be 40.5%. The specimen with 2 wt % PEG-silane and without any salt had a high packing density after the consolidation but showed a brittle behavior. AS800 with no added PEG-silane and 0.75M TMACI could be liquefied, but it was very sticky and could not be extruded in an rubber mold. The same behavior was found for the specimen containing only 1 wt % PEG-silane. As shown in FIG. 14, both specimens had relatively low packing densities. The bodies with 2 wt % PEG-silane and 0.5M salt could be liquefied and further processed and showed a moderate packing density as shown in FIG. 14, The relative densities of the specimens used for the uniaxial compression tests are plotted as a function of the consolidation pressure in FIG. 15. A sudden increase in the relative density between 5 and 10 MPa can be recognized. Between these two pressures the behavior of the consolidated slurry changes from plastic to brittle as well.

The isoelectric point of AS800 is slightly higher than the value that was measured for Si$_3$N$_4$ E-03 (Ube Industries, Ltd., Yamaguchi, Japan) by Colic et al. [M. Colic, G. V. Franks, M. L. Fisher and F. F. Lange, "Compositionally Dependent Si 2p Binding Energy Shifts in Silicon Oxynitride Thin Films," J. Am. Ceram. Soc., 69 [4] 314–16 (1986)] This might be caused either by some sintering additives with a very high isoelectric point or by a proprietary dispersant. The zeta potential versus pH curves are different for the AS800 and the Ube E-03 silicon nitride, both coated with PEG-silane. The AS800 has a smaller absolute value of the zeta potential over the whole measured range. This might be caused by the dissolution of some sintering additives, which would increase the ionic strength. An increase in the ionic strength causes a shrinkage of the electrostatic double layer and therefore a smaller repulsive potential. Dissolved ions could also adsorb on the surface of silicon nitride particles and neutralize some surface sites, which would reduce the total amount of surface charge and therefore the zeta potential. Colic et al., showed that the zeta potential of PEG-silane-coated Si$_3$N$_4$ Ube E-03 powder does not change after a period of 3 weeks at pH 10. Therefore, the shift of the zeta potential of AS800 powder observed here after five weeks could be due either to the dissolution of some additives or to the "aging" of the dispersant. The variation from batch to batch might be a result of slightly different particle sizes or specific surface areas.

The shear thinning behavior of the flocced and the coagulated slurries is a consequence of the increasing break up of the static structure into smaller and smaller flow units with increasing strain rate. The static structure is formed at rest, when no shear forces are applied to the slurry, because the particles are either weakly or strongly attractive to one another. With increasing strain rate the structure breaks into smaller and smaller flow units and therefore releases more and more trapped liquid, in which the smaller flow units can move. Flocced slurries always show higher viscosities than coagulated slurries with the same volume fraction of solids. In the flocced state the particles show no net surface charge and therefore there is no electrostatic repulsion at all. Due to the lack of electrostatic repulsion the particles are strongly attracted to each other by van der Waals forces. Hence the force to pull the particles apart or to move them past each other is larger than in the coagulated state, in which the particles are kept at a certain small distance from each other by a short-range repulsive potential. According to FIGS. 9(a) and (b) an addition of 0.5 M TMACI or TMANO$_3$ is sufficient to change the interparticle pair potential from fully repulsive to weakly attractive. It might be that at a concentration of 0.5 M TMACI the counterion cloud is collapsed to its minimum thickness and the PEG-silane molecules are coiled up to their minimum extent. In order to determine the exact influence of the salt concentration on the counterion cloud and the PEG-silane molecules, further experiments are necessary. The increase in the viscosity of all the slurries at strain rates close to 1000 s$^{-1}$ is either a shear thickening effect or due to the fact that the rheometer becomes unreliable above a certain torque because it can not compensate inertial effects anymore.

The performed measurements did not provide information on the amount of surface coverage: whether the silicon nitride particles were fully covered with a monolayer of PEG-silane molecules or not, or whether they were covered with multiple layers. It is predicted that the silicon nitride particles in the slurries containing 1 wt % PEG-silane instead of 2 wt % are subject to weaker steric repulsion and have a deeper potential well. A deeper secondary minimum means a higher slope of the potential and hence a higher force to pull the particles apart. This in turn causes a stronger network with a higher shear modulus, which explains the higher measured initial shear modulus for the consolidated slurry containing only 1 wt % PEG-silane compared to the ones measured for slurries containing 2 wt %. The reason the slurry prepared with 1 wt % PEG-silane had a lower yield stress ($\tau_y$) than ones with 2 wt % PEG-silane is very probably the lower packing density. A lower volume fraction of solids means there are fewer particles that need to be pulled apart to initiate flow. The yield stress scales as $\tau_y \propto \Phi^x$ with x≈2 to 4 and hence decreases with decreasing volume fraction ($\Phi$). [G. M. Channell and C. F. Zukoski, "Shear and Compressive Rheology of Aggregated Alumina Suspensions," AICHE J., 43 [7] 1700–1708 (1997).] The shear modulus decreases as well with decreasing volume fraction. However, in case of the slurry with 1 wt % PEG-silane, the increase of the shear modulus due to the stronger attraction overcomes the decrease due to the smaller volume fraction of solids. Therefore the value for the initial shear modulus of the sample with 1 wt % PEG-silane is larger than the values of the samples with 2 wt % PEG-silane, despite its lower volume fraction. The slurries formulated with 2 wt % PEG-silane and 0.5 M $TMANO_3$ at pH 8.7 show a higher shear modulus and a higher yield stress than the ones with the same formulation at pH 10.1. This might be due to the decreased size of the counterion cloud as the pH is shifted towards the isoelectric point. A smaller electrostatic repulsion means a deeper potential well and therefore a stronger network with a higher shear modulus and a higher yield stress.

The fluidized, consolidated bodies were observed to exhibit thixotropic behavior. The shear modulus strongly depends on the past shear history. Immediately after consolidation, the bodies are very stiff because some particles have been pushed together during pressure filtration. The application of mechanical forces to the network after the consolidation causes the particles to be separated, which allows the body to fluidize and flow. When the fluidized body is allowed to rest after flow, the body appears to become stiffer for reasons that are not understood. Our results show that the elastic modulus of the fluidized, consolidated bodies still increased after 30 hours. Likewise it cannot be explained why the shear modulus increased nearly linearly with time after the first six hours. The fact that the shear modulus dropped again to its initial value after oscillating the vane tool 21 hours after the measurement had been started shows that the slurry did not dry out in the meantime. The AS800 slurries show higher shear moduli and a much more pronounced dilatant and thixotropic behavior in comparison with alumina slurries. This different behavior might characteristic to silicon nitride or it could be caused by some sintering additives in the $Si_3N_4$ AS800 powder.

In addition to their thixotropic behavior, the consolidated and liquefied slurries showed dilatant behavior. For high particle packing densities and high strain rates, the particles can not diffuse into vacant sites as fast as they are being moved around, thus, the particle network begins to support the applied stress without flow. This phenomenon, called dilatancy, is probably why the consolidated bodies did not exhibit a plastic behavior during uniaxial compression at the relatively rapid displacement rate of 1 mm/min. At very low strain rates the bodies might flow under uniaxial compression. The dependence of the mechanical behavior on the loading rate needs to be investigated. A transition from plastic to brittle behavior appears to take place between a consolidation pressure of 5 and 10 MPa. This supposition is supported by two different experimental results. First, the specimens consolidated at pressures >5 MPa could not be liquefied after mechanical testing, whereas the ones consolidated at ≦5 MPa could be forced to flow. Furthermore a jump in the relative density versus the consolidation pressure can be noticed in FIG. 15 between a consolidation pressure of 5 and 10 MPa. But this transition is much less abrupt than the ones observed for alumina by Franks and Lange. [G. V. Franks and F. F. Lange, "Plastic-to-Brittle Transition of Saturated Alumina Powder Compacts," *J. Am. Ceram. Soc.,* 79 [12] 3161–68 (1996).]

As expected, the powder in the slurry formulated without added salt produces the highest relative density and exhibits brittle behavior, consistent with observations of Franks and Lange. [G. V. Franks and F. F. Lange, "Plastic-to-Brittle Transition of Saturated Alumina Powder Compacts," J. Am. Ceram. Soc., 79 [12] 3161–68 (1996).] In a dispersed slurry the particles are highly repulsive and can easily rearrange during consolidation. This is the reason why dispersed slurries produce the highest packing densities. As discussed by Franks and Lange, [G. V. Franks and F. F. Lange, "Plastic-to-Brittle Transition of Saturated Alumina Powder Compacts," J. Am. Ceram. Soc., 79 [12] 3161–68 (1996).] after packing together, particles in a dispersed slurry can easily be pushed into their primary minimum because of the shallow slope of the potential vs. particle separation curve. Therefore the flow stress of the body exceeds the strength and the body fractures prior to flow. The slurries formulated with either no added PEG-silane or 1 wt % of PEG-silane show low packing densities and a high viscosity. This appears to be caused by the smaller steric repulsion compared to slurries formulated with 2 wt % PEG-silane. A deeper potential well causes a stronger particle network, and thus a higher flow stress and a lower packing density. The slurries at pH 8.7 showed a slightly lower packing density in the filter pressed state compared to the ones with the same formulation at pH 10.1. This difference might be caused either by the fact that two different as received slurries were used for these experiments or that the slurries at pH 8.7 were not as dispersed as the ones at pH 10.1 due to the decreased electrostatic repulsion. The higher relative density after the isopressing could have its origin in a different behavior of some sintering additives at pH 8.7 than at pH 10.1. FIG. 15 shows that the packing densities of the consolidated weakly attractive slurries used for mechanical testing exhibit weak sensitivity to the applied consolidation pressure, as it is expected for a coagulated system. [G. V. Franks and F. F. Lange, "Plastic-to-Brittle Transition of Saturated Alumina Powder Compacts," J. Am. Ceram. Soc., 79 [12] 3161–68 (1996).] Hence the shaped parts should show less cracking and less shape distortion due to density gradients in the consolidated state compared to parts produced from flocculated slurries.

AS800 is a commercial slurry from Allied Signal. Its major ingredient is silicon nitride; it also contains small fractions of processing and sintering aids. It has been demonstrated that the AS800 is suitable for shape forming using the colloidal isopress forming method. Measurements of the shear modulus and the relative density of consolidated AS800 slurries with different percentages of PEG-silane indicated that an amount of 2 wt % is necessary for a sufficient steric repulsion between the silicon nitride particles. Insufficient steric repulsion leads to high viscosities, high shear moduli and low packing densities, which all complicate the processing. Viscosity measurements showed that a salt concentration of 0.5 M TMACl or TMANO$_3$ is sufficient to change the interparticle pair potential from fully repulsive to weakly attractive. At a consolidation pressure of 2 MPa, a relative density of ≈51% could be reached after the filter pressing. A plastic-to-brittle transition of the saturated AS800 powder compacts might occur between consolidation pressures of 5 and 10 MPa. Dynamic rheology experiments on AS800 slurries which were consolidated at a pressure ≦5 MPa and liquefied beforehand resulted in a dilatant and thixotropic behavior of the AS800 slurries and high shear moduli. The relative density could be increased to ≈60% after the isopressing. isopressed bars could be sintered to full density.

ZIRCONIA EXAMPLES

Zirconium dioxide, also known as zirconia, is an important ceramic material, particularly for structural applications. Due to its polymorphic character, it is possible to stabilize different crystal structures at room temperature with the addition of small amounts of another oxide to form a solid solution. The transition from the tetragonal to the monoclinic structure induces a large volume expansion. It was discovered that the formation of a multi-phase material, partially-stabilized zirconia (PSZ), will have beneficial mechanical properties. [R. C. Garvie, R. H. Hannink, and R. T. Pascoe, "Ceramic Steel?" Nature, 285, 703–4 (1975)] Stress induced phase transformations near a crack tip propagating through PSZ will generate a crack closing force, reducing the stress intensity associated with the crack and helping to arrest crack growth. This phenomenon greatly enhances the toughness of zirconia materials compared to most ceramic materials.

Also zirconia has been applied to electrochemical applications due to its high oxygen ion conductivity. By increasing the oxygen vacancy concentration in zirconia, the ionic conductivity is increased over a wide range of temperatures and pressures. For this reason, zirconia has been used as a solid electrolyte in solid-oxide fuel cells (SOFCs) and in oxygen sensors. [S. C. Singhal, "Science and technology of solid-oxide fuel cells," MRS Bull., 25 [3] 16–21 (2000); J. Nowotny, M. Rekas, T. Bak, "Defect chemistry and defect-dependent properties of undoped and stabilised zirconia. Bulk vs interface," Key Eng. Mater., 153–154, 211–40 (1998)] Its high thermal stability allows zirconia to be used in high temperature SOFCs, at temperature ranges beyond most metal materials, improving efficiency and producing pollution-free energy.

Partially stabilized zirconia containing 3 mol % Y203 (Tosch Corporation, Japan; Grade TZ-3YS) and an average particle size of 0.39 μm was used in this study. Aqueous zirconia slurries were prepared at 20 volume percent solid content. As determined by Klein, et. al., [S. Klein, M. Fisher, G. Franks, M. Colic, and F. Lange, "Effect of the Interparticle Pair Potential on the Rheological Behavior of Zirconia Powders: I, Electrostatic Double Layer Approach," J. Amer. Ceram. Soc., 83 [3] 513–17 (2000). S. Klein, M. Fisher, G. Franks, M. Colic, and F. Lange, "Effect of the Interparticle Pair Potential on the Rheological Behavior of Zirconia Powders: II, The Influence of Chem-Adsorbed Silanes," submitted to J. Amer. Ceram. Soc.], it is difficult to produce moderately high solid fraction, plastic powder compacts after pressure filtration of electrostatically stabilized zirconia that has been coagulated with salt. Therefore, N-(Triethoxysilylpropyl)-O-Polyethylene Oxide Urethane (referred to here as PEG-silane) was used in conjunction with added tetraethylammonium chloride (TEACl) salt The PEG-silane was first added to the deionized water at a concentration of 1 weight percent with respect to the zirconia weight, and then the zirconia powder was mixed in with stirring and sonication. The pH was adjusted to 11 using tetraethylammonium hydroxide (TEAOH). TEACl was added to a concentration of 1.0 molar with respect to the liquid volume. The slurries were allowed to equilibrate for a minimum of 24 hours while rolling to maintain agitation. Prior to any further processing, the pH value was adjusted to within 0.1 pH units of 11.

Slurries were consolidated by pressure filtration, under 5 MPa pressure, using a cylindrical stainless steel die with a diameter of 45 mm. The pressure was maintained at a constant level during the entire filtration process, and held for at least 10 minutes after the plunger had ceased moving. After removal from the press, the powder compact was transferred to a plastic bag, and any network that had formed during pressure filtration was broken down by vibration. This produced a very fluid, consolidated slurry that was transferred to a syringe.

The consolidated zirconia slurry was injected into a silicone rubber mold that had dry alumina powder (Sumitomo Chemical Co., Japan; Grade AKP-15) packed into one end to absorb any liquid squeezed out during isopressing. The consolidated zirconia slurry was isolated from the alumina powder by a piece of polytetraflouroethylene filter paper. An isopressure of 100 MPa was applied for 1 minute using a cold isostatic press. After pressure release, the elastic zirconia compact was ejected and dried in a 70° C. oven for at least 24 hours. The weight loss during the 70° C. oven run was assumed to be water that was remaining in the compact after isopressing. The samples were then heated to 800° C. for 4 hours in air to vaporize the PEG-silane and the TEACl salt. Because they are removed at the same time, it is difficult to resolve the weight of the individual silane and salt components, and therefore the volume calculated from the weight loss after the high temperature heat treatment is made by an averaged density of about 1.1 g/cc.

Results for Zirconia Examples

From Klein, et.al. [S. Klein, M. Fisher, G. Franks, M. Colic, and F. Lange, "Effect of the Interparticle Pair Potential on the Rheological Behavior of Zirconia Powders: II, The Influence of Chem-Adsorbed Silanes," submitted to J. Amer. Ceram. Soc.], the combined effects of PEG-silane and added salt produce an easily deformable compact, with near zero flow stress, after pressure filtration at 5 MPa. From the slurry used here, with 1.0 wt % PEG-silane and 1.0M TEACl, the compact formed after 5 MPa pressure filtration had a relative density of 45%. Additionally, the consolidated slurry has a more fluid-like consistency and that could almost be poured into the rubber molds.

After isopressing at 100 MPa for 1 minute, the consolidated zirconia slurry was completely converted to an elastic compact The relative density increased to 51%, and slight shrinkage associated with this increase in relative density allowed the compact to be easily removed from the mold. No cracking or shape distortion was detected during drying or the 800° C. heat treatment. Sintering at higher temperatures could fully densify isopressed bodies.

Although the foregoing invention has been described in some detail by way of illustration and example for purposes of clarity and understanding, it will be obvious that various modifications and changes which are within the knowledge of those skilled in the art are considered to fall within the scope of the appended claims.

What is claimed is:

1. A method of forming a part from a powder, comprising:
   forming a colloidal slurry containing particles of the powder suspended in a fluid;
   consolidating said slurry at a pressure below a critical value to obtain a consolidated body, wherein said critical value is a pressure below which the consolidated body can be made to flow,
   fluidizing the consolidated body such that the fluidized material is transferred into a flexible mold;
   subjecting the mold containing the fluidized material to isopressure above said critical value for a time sufficient for the fluidized material to convert to an elastic body; and
   removing the elastic body from the mold.

2. The method of claim 1 wherein said particles are ceramic, and said elastic body is green and is sintered to form a ceramic part.

3. The method of claim 1 wherein said slurry contains non-colloidal components, and including the step of filtering the slurry prior to consolidating it to remove the non-colloidal components.

4. The method of claim 1 wherein said critical value is determined experimentally for each powder and slurry formulation needed to produce the short-range repulsive potential.

5. The method of claim 1 wherein said slurry is consolidated by pressure filtration.

6. The method of claim 1 including adding to said slurry a shrouding material that shrouds the suspended particles, but does not significantly contribute to the van der Waals potential between them.

7. The method of claim 6 in which said shrouding material comprises a dense layer of counterions produced by adding excess salt to the dispersed slurry.

8. The method in claim 6 in which said shrouding material is a layer of molecules that are chemically attracted to the surface of the particles.

9. The method of claim 1 wherein said mold contains a porous region.

10. The method of claim 1 in which said powder is alumina.

11. The method of claim 1 in which said powder is silicon nitride.

12. The method of claim 1 in which said powder is zirconia.

13. The method of claim 1 in which said powder is silicon carbide.

14. The method of claim 1 in which said powder is selected from the group consisting of titania, aluminum nitride, silica, barium titanate, metallic, polymeric, electronic, biological pharmaceutical materials.

15. A method of forming a ceramic part from a ceramic powder, comprising:
   forming a colloidal slurry containing particles of the ceramic powder suspended in a fluid;
   consolidating said slurry by pressure filtration at a pressure below a critical value to form a consolidated body that can be made to flow, wherein said critical value is a pressure below which the consolidated body can be made to flow;
   fluidizing the consolidated body such that the fluidized material is transferred into a flexible mold;
   subjecting the mold containing the fluidized material to isopressure above said critical value for a time sufficient for the fluidized material to convert to an elastic body; and
   removing the elastic body from the mold.

16. The method of claim 15 wherein said particles are ceramic, and said elastic body is green and is sintered to form a ceramic part.

17. The method of claim 15 wherein said slurry contains non-colloidal components, and including the step of filtering the slurry prior to consolidating it to remove the non-colloidal components.

18. The method of claim 15 wherein said critical value is determined experimentally for each powder and slurry formulation needed to produce the short-range repulsive potential.

19. The method of claim 15 wherein said slurry is consolidated by pressure filtration.

20. The method of claim 15 including adding to said slurry a shrouding material that shrouds the suspended particles, but does not significantly contribute to the van der Waals potential between them.

21. The method of claim 20 in which said shrouding material comprises a dense layer of counterions produced by adding excess salt to the dispersed slurry.

22. The method in claim 20 in which said shrouding material is a layer of molecules that are chemically attracted to the surface of the particles.

23. The method of claim 15 wherein said mold contains a porous region.

24. The method of claim 15 in which said powder is alumina.

25. The method of claim 15 in which said powder is silicon nitride.

26. The method of claim 15 in which said powder is zirconia.

27. The method of claim 15 in which said powder is silicon carbide.

28. The method of claim 15 in which said powder is selected from the group consisting of titania, aluminum nitride, silica, barium titanate, metallic, polymeric, electronic, biological and pharmaceutical materials.

* * * * *